US010110716B2

(12) United States Patent
Lim et al.

(10) Patent No.: US 10,110,716 B2
(45) Date of Patent: Oct. 23, 2018

(54) APPARATUS AND METHOD FOR PROVIDING A SERVICE CONNECTION THROUGH ACCESS LAYER IN WIRELESS COMMUNICATION SYSTEM

(71) Applicant: Samsung Electronics Co., Ltd., Suwon-si (KR)

(72) Inventors: Han-Na Lim, Seoul (KR); Jung-Shin Park, Seoul (KR); Jin-Sung Lee, Suwon-si (KR); Beom-Sik Bae, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 154 days.

(21) Appl. No.: 14/791,379

(22) Filed: Jul. 3, 2015

(65) Prior Publication Data
US 2016/0007399 A1  Jan. 7, 2016

(30) Foreign Application Priority Data

Jul. 4, 2014 (KR) .......................... 10-2014-0083971

(51) Int. Cl.
*H04L 29/08* (2006.01)
*H04L 29/06* (2006.01)
(Continued)

(52) U.S. Cl.
CPC ............ *H04L 69/326* (2013.01); *H04L 69/18* (2013.01); *H04L 69/321* (2013.01); *H04W 76/14* (2018.02);
(Continued)

(58) Field of Classification Search
CPC ..... H04L 69/18; H04L 61/1511; H04L 47/24; H04L 47/801; H04L 69/323;
(Continued)

(56) References Cited

U.S. PATENT DOCUMENTS

2006/0209768 A1* 9/2006 Yan .................... H04L 29/12311
370/338
2010/0195621 A1   8/2010 Kekki et al.
(Continued)

FOREIGN PATENT DOCUMENTS

EP      1770940 A1    4/2007
EP      1 860 831 A1  11/2007
(Continued)

OTHER PUBLICATIONS

International Search Report corresponding to International Application No. PCT/KR2015/006934, dated Oct. 22, 2015.
(Continued)

*Primary Examiner* — Jamal Javaid
*Assistant Examiner* — Rosene Clark
(74) *Attorney, Agent, or Firm* — McAndrews, Held & Malloy, Ltd.

(57) ABSTRACT

The present disclosure relates to a pre-5th-Generation (5G) or 5G communication system to be provided for supporting higher data rates Beyond 4th-Generation (4G) communication system such as Long Term Evolution (LTE).
According to an embodiment of the present disclosure, a method for receiving a service by a user equipment (UE) in a wireless communication system comprises, transmitting, through an access layer to the base station, a service request message including at least one of a service name related to application data, the application data, and a temporary UE identity and receiving, from the base station, a service request accept message including response data of the application data provided from a base station server connected with a base station.

22 Claims, 17 Drawing Sheets

(51) Int. Cl.
*H04W 80/00* (2009.01)
*H04W 76/14* (2018.01)
*H04L 29/12* (2006.01)

(52) U.S. Cl.
CPC ......... *H04W 80/00* (2013.01); *H04L 61/1511* (2013.01); *H04L 61/1588* (2013.01)

(58) Field of Classification Search
CPC ..... H04L 69/324; H04L 67/322; H04L 65/80; H04L 45/12; H04L 12/4633; H04L 29/06523; H04L 43/0888; H04L 65/60; H04L 65/601–65/605; H04L 12/189; H04L 65/4069–65/4092; H04L 65/608; H04L 67/02; H04L 69/165; H04W 24/02; H04W 28/16; H04W 28/24; H04W 72/1236; H04W 36/0066; H04W 76/00; H04W 84/12; H04W 88/06
See application file for complete search history.

(56) References Cited

U.S. PATENT DOCUMENTS

| | | | |
|---|---|---|---|
| 2011/0103492 A1 | 5/2011 | Blakeney et al. | |
| 2012/0087352 A1 | 4/2012 | Tan et al. | |
| 2012/0208561 A1 | 8/2012 | Zhang et al. | |
| 2013/0083661 A1* | 4/2013 | Gupta | H04W 28/0215 370/235 |
| 2013/0290493 A1* | 10/2013 | Oyman | H04W 72/0413 709/219 |
| 2014/0016539 A1 | 1/2014 | Rohit | |
| 2014/0029513 A1* | 1/2014 | Takahashi | H04W 36/0005 370/328 |
| 2014/0029534 A1 | 1/2014 | De Pasquale et al. | |
| 2015/0181459 A1* | 6/2015 | Zhu | H04W 28/0268 370/236 |
| 2015/0215809 A1* | 7/2015 | He | H04L 61/2038 370/338 |
| 2015/0270979 A1* | 9/2015 | Andrada | H04L 51/38 370/390 |
| 2015/0288530 A1* | 10/2015 | Oyman | H04W 56/00 370/312 |
| 2015/0350989 A1* | 12/2015 | Himayat | H04W 36/0066 370/331 |
| 2015/0373075 A1* | 12/2015 | Perlman | H04L 65/608 709/217 |
| 2016/0105825 A1* | 4/2016 | Hedberg | H04L 63/0407 370/331 |
| 2016/0134677 A1* | 5/2016 | Mueller | H04L 65/602 709/219 |
| 2016/0219475 A1* | 7/2016 | Kim | H04W 76/025 |
| 2016/0337941 A1 | 11/2016 | Andrei | H04W 48/14 |
| 2017/0346874 A1* | 11/2017 | Schmidt | H04N 21/2343 |

FOREIGN PATENT DOCUMENTS

| | | |
|---|---|---|
| EP | 2688244 A2 | 1/2014 |
| WO | 2010-067999 A2 | 6/2010 |

OTHER PUBLICATIONS

Extended European Search Report Appln No. 15814553.2 dated Feb. 6, 2018 (10 pages).

* cited by examiner

APPARATUS AND METHOD FOR PROVIDING A SERVICE CONNECTION THROUGH ACCESS LAYER IN WIRELESS COMMUNICATION SYSTEM

CROSS-REFERENCE TO RELATED APPLICATION(S)

This application claims the benefit under 35 U.S.C. § 119(a) of a Korean patent application filed in the Korean Intellectual Property Office on Jul. 4, 2014 and assigned Serial No. 10-2014-0083971, the entire disclosure of which is incorporated herein by reference.

TECHNICAL FIELD

The present disclosure concerns apparatuses and methods for providing service connections through an access layer in wireless communication systems.

BACKGROUND

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Communication systems are being developed aiming increased throughput. Latency plays a role as a critical variable in increasing throughput. For next-generation communication systems, ultra-realistic services are under discussion, and such ultra-realistic services require very short latency. An example of latency required in an ultra-realistic service is one second for sense of pain, 100 milliseconds for auditory sense, 10 milliseconds for visual sense, and one millisecond for tactile sense. For next-generation communication systems, the data rate is expected to be sharply increased.

Meanwhile, as a transport layer, the transmission control protocol (TCP) is mostly used between a user equipment (UE) and a server providing a service to the UE. However, the TCP, by its nature, has a limitation in reducing latency. For example, assuming that the TCP uses a window scheme for flow control, the UE transmits data corresponding to a predetermined window size and increases the window size to thereby increase the data transmitted. However, when the transmitted data is damaged or has an error, the TCP controls the data rate by reducing the window size in half. Accordingly, the latency of transport layer is increased.

Accordingly, in order to meet the latency required by the next-generation communication system, it is material to reduce the latency of transport layer, and research is required to reduce the latency of transport layer.

Meanwhile, the above-described information is provided only as background information for a better understanding of the present disclosure. No determinations and claims are made as to whether what has been described in this section may be applicable as the prior art related to the present disclosure.

The above information is presented as background information only to assist with an understanding of the present disclosure. No determination has been made, and no assertion is made, as to whether any of the above might be applicable as prior art with regard to the present disclosure.

SUMMARY

The present disclosure proposes apparatuses and methods for providing service connections through an access layer in wireless communication systems.

According to an embodiment of the present disclosure, a method for receiving a service by a user equipment (UE) in a wireless communication system comprises, transmitting, through an access layer to the base station, a service request message including at least one of a service name related to application data, the application data, and a temporary UE identity and receiving, from the base station, a service request accept message including response data of the application data provided from a base station server connected with a base station.

According to an embodiment of the present disclosure, a method for providing a service by a base station in a wireless communication system comprises receiving, from a user equipment (UE) operating in a first mode providing a service connection through an access layer, a service request message including at least one of a service name related to application data, the application data, and a temporary UE identity and transmitting, to the UE, a service request accept message including response data of the application data provided from a base station server connected with the base station.

According to an embodiment of the present disclosure, a user equipment (UE) receiving a service in a wireless communication system comprises a controller configured to determine an operation mode of the UE, a transmitting unit configured to transmit a service request message including at least one of a service name related to application data, the application data, and a temporary UE identity through an access layer to the base station, and a receiving unit configured to receive, from the base station, a service request accept message including response data of the application data provided from a base station server connected with a base station.

According to an embodiment of the present disclosure, a base station for providing a service in a wireless communication system comprises a receiving unit configured to, from a user equipment (UE) operating in a first mode providing a service connection through an access layer, a service request message including at least one of a service name related to application data, the application data, and a temporary UE identity and a transmitting unit configured to transmit, to the UE, a service request accept message including response data of the application data provided from a base station server connected with the base station.

Other aspects, advantages, and core features of the present disclosure will be apparent to one of ordinary skill in the art from the following detailed description of exemplary embodiments of the present disclosure, taken into conjunction with the drawings.

Before getting into the detailed description of the present disclosure, particular terms or phrases used herein may be defined merely for ease of description. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to," "be bound to or with," "have," or "have a property of." As used herein, the term "controller" may mean any device, system, or part thereof controlling at least one operation. As used herein, the term "device" may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

The present disclosure may minimize a transmission delay that occurs in a transport layer by providing, through an access layer, a service connection used to be transmitted through the transport layer.

BRIEF DESCRIPTION OF THE DRAWINGS

Particular preferred embodiments of the present disclosure and the foregoing and other aspects, features, and advantages will be apparent from the following detailed description taken in conjunction with the accompanying drawings, wherein.

It should be noted that the same or similar reference denotations may be used to refer to the same or similar elements, features, or structures throughout the drawings.

DETAILED DESCRIPTION

Figure 1:
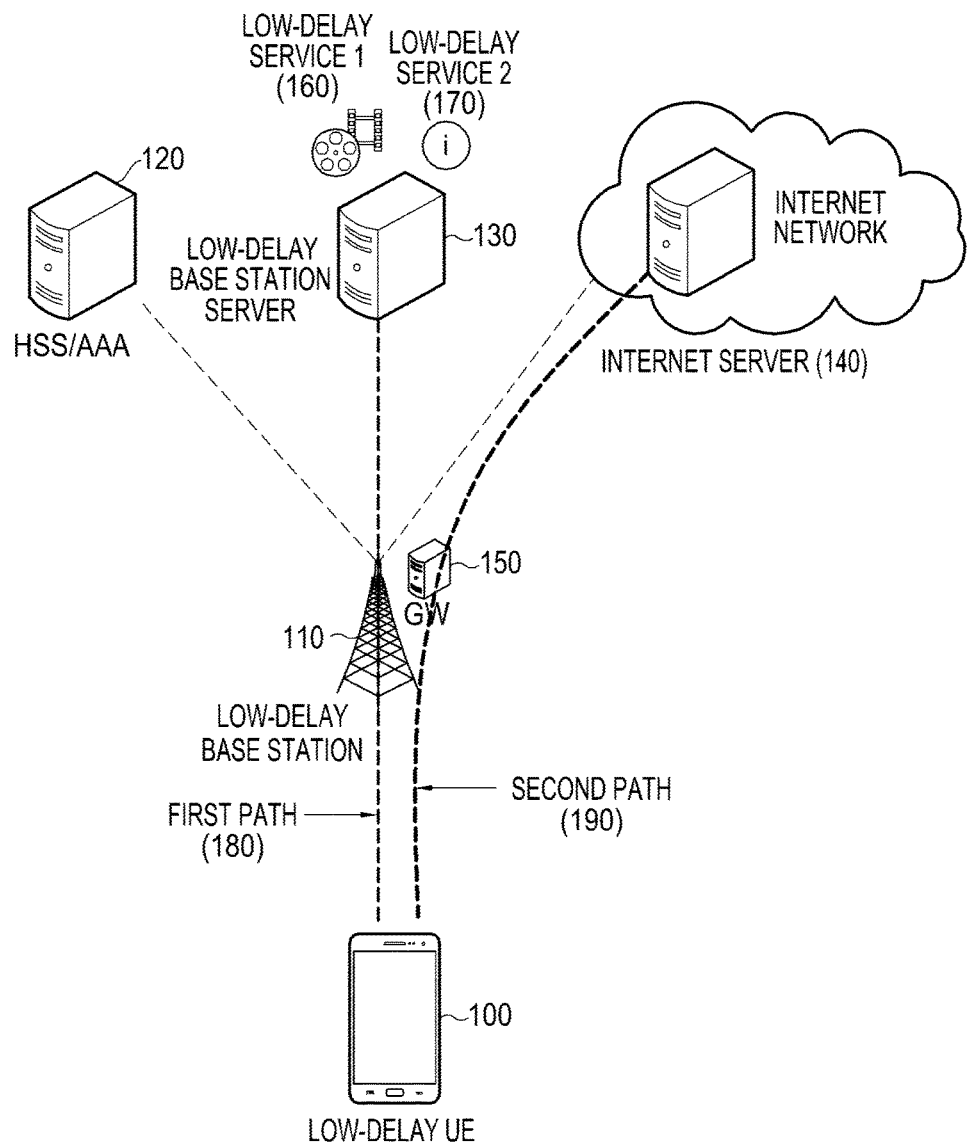
FIG. 1 is a view illustrating an example of a structure of a low-delay providing system according to an embodiment of the present disclosure.

Hereinafter, preferred embodiments of the present disclosure are described in detail with reference to the accompanying drawings. When determined to make the subject matter of the present disclosure unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

Various changes may be made to the present disclosure, and the present disclosure may come with a diversity of embodiments. Some embodiments of the present disclosure are shown and described in connection with the drawings. However, it should be appreciated that the present disclosure is not limited to the embodiments, and all changes and/or equivalents or replacements thereto also belong to the scope of the present disclosure.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined in connection with embodiments of the present disclosure, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present disclosure, an electronic device as disclosed herein may include a communication function. For example, the electronic device may be a smartphone, a tablet PC, a personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD)), electronic clothes, an electronic bracelet, an electronic necklace, an electronic appcessory, an electronic tattoo, or a smart watch.

According to various embodiments of the disclosure, the electronic device may be a smart home appliance with a communication function. For example, the smart home appliance may be a television, a digital video disk (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™), a gaming console, an electronic dictionary, a camcorder, or an electronic picture frame.

According to various embodiments of the disclosure, the electronic device may be a medical device (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), an aviation electronic device, a security device, or a robot for home or industry.

According to various embodiments of the disclosure, the electronic device may be a piece of furniture with a communication function, part of a building/structure, an electronic board, an electronic signature receiving device, a projector, or various measurement devices (e.g., devices for measuring water, electricity, gas, or electromagnetic waves).

According to various embodiments of the disclosure, an electronic device may be a combination of the above-listed devices. It should be appreciated by one of ordinary skill in the art that the electronic device is not limited to the above-described devices.

According to an embodiment of the present disclosure, the user equipment (UE) may be, e.g., an electronic device.

In connection with the following embodiments of the present disclosure, a scheme for reducing the transmission delay of the transport layer in the evolved packet system (EPS) is described as an example. Further, the scheme for reducing transmission delay of the transport layer described in connection with embodiments of the present disclosure may be slightly modified not to depart from the scope of the present disclosure to be applicable to other communication systems with the same technical background.

A UE performs a connection establishment procedure with a server to receive a service from the server, and when the connection establishment procedure is complete, the UE communicates information related to the service with the server. Assuming a long term evolution (LTE) communication system, the connection establishment procedure is shown in the following Table 1. It should be noted that the connection establishment procedure shown in Table 1 is merely an example and that the procedure does not include all necessary procedures for establishment of a connection between the UE and the server. That is, the UE and the server may establish a connection only with some of the steps of Table 1 or by adding additional steps that are not shown in Table 1.

TABLE 1

First step: accesses the LTE communication system and obtains the Internet protocol (IP) address of the UE
Second step: executes an application of the UE
Third step: Activation of LTE communication system connection
Fourth step: obtains the IP address of the server through a domain name system (DNS) query
Fifth step: TCP connection establishment
Sixth step: establishes a transport layer security (TLS) connection That is, when the user powers on the UE, the UE accesses the LTE communication system, and the UE transmits an attach request message to the server to obtain the IP address from the server (step 1). The user executes an application related to the service desired to be used on the UE (step 2), and the UE transmits a service request message to the server through the application to activate the LTE communication system connection (step 3). The UE transmits a DNS query to obtain the IP address of the server providing the application related to the service (step 4).

Thereafter, the UE establishes a TCP connection with the server (step 5). The UE considers whether a security connection is required, and when the security connection is required, the UE establishes a TLS connection (step 6). Of course, when no security connection is required, step 6 may be omitted. Then, the UE completes the connection establishment procedure through steps 1 to 6 and transmits first application data to the server.

The connection establishment procedure may be separated into a network connection establishment procedure and a service connection establishment procedure. The network connection establishment procedure includes steps 1 and 3, and the service connection establishment procedure includes steps 2 and 4 to 6. The service connection establishment procedure is a process that arises due to use of a transmission control protocol/internet protocol (TCP/IP). Since several steps should be performed to complete the service connection establishment procedure, the use of TCP/IP causes an access delay.

In connection with the following embodiments of the present disclosure, there are described a low-delay providing system directly providing service connection establishment between a UE and a server in an access layer without using a transport layer protocol and network layer protocol, e.g., TCP/IP, which cause an access delay, and a method for establishing a connection between the UE and the server in the low-delay providing system. The low-delay providing system means a system that directly provides service connection establishment between a UE and a server in the access layer to minimize an access delay that occurs in the transport layer.

FIG. 1 is a view illustrating an example of a structure of a low-delay providing system according to an embodiment of the present disclosure.

Referring to FIG. 1, the low-delay providing system generally includes a low-delay UE 100 and a low-delay network. The low-delay network provides a low-delay service 1 160 and a low-delay service 2 170 to the low-delay UE 100. The low-delay network includes a low-delay base station 110, a home subscriber server (HSS)/authentication-authorization-accounting (AAA) 120, a low-delay base station server 130, an Internet server 140, and a gateway (GW) 150. The Internet server 140 is connected to the low-delay base station 110 through the GW 150.

The low-delay UE 100 supports a low-delay protocol used in the low-delay providing system and receives a low-delay service, e.g., low-delay service 1 160 and low-delay service 2 170, from the low-delay base station server 130 using the low-delay protocol. The low-delay service may include a service specialized per mobile network operator (MNO) or an Internet service provided from a contents provider that entered into a service level agreement (SLA) with the MNO. The low-delay service may be varied per low-delay base station supporting the low-delay service. As an example, a delay-based streaming service is varied per base station supporting the streaming service.

The low-delay base station 110 supports the low-delay protocol and performs a service connection function, a session management function, and an Internet bearer connection function. Further, the low-delay base station 110 may support multiple access networks. For example, the low-delay base station 110 may support a 5G network or an LTE network. In such case, a bearer related to low-delay communication may be connected through the 5G network, and an Internet bearer may be connected through the LTE network.

The low-delay base station server 130 is connected with the low-delay base station 110 and provides the low-delay service to the low-delay UE 100 through the low-delay base station 110. The low-delay base station server 130 may provide a plurality of low-delay services to the low-delay UE 100.

The HSS/AAA 120 is connected with the low-delay base station 110, and the HSS/AAA 120 performs authentication on the low-delay UE 100 and management on the subscription information of the low-delay UE 100 through the low-delay base station 110. Here, the subscription information is a list of low-delay services to which the low-delay UE 100 subscribes, for example, and may include the Quality of Service (QoS) of each service to which the low-delay UE 100 subscribes, the name of each low-delay service, and a category name collectively referring to a plurality of low-delay services.

The low-delay UE 100 sends a request for a service to the low-delay base station 110. The low-delay base station 110, when the service requested by the low-delay UE 100 is supported by the low-delay base station 110, provides the requested service to the low-delay UE 100 through the low-delay base station server 130. That is, the low-delay UE 100 receives low-delay service 1 160 and/or low-delay service 2 170 through a first path 180 shown. Hereinafter, the mode in which the service requested by the low-delay UE 100 is provided from the low-delay base station server 130 is referred to as a low-delay providing mode.

However, when the service requested by the low-delay UE 100 is not supported by the low-delay base station 110, the low-delay base station 110 provides the requested service to the low-delay UE 100 through the Internet server 140. That is, the low-delay UE 100 receives the service through a second path 190 shown. Hereinafter, the mode in which the service requested by the low-delay UE 100 is provided from the Internet server 140 is referred to as a fallback mode.

Meanwhile, the service list, in principle, includes low-delay services supported by the low-delay base station connected with the low-delay UE 100. However, when a neighbor base station connected with the low-delay base station 100 is a low-delay base station and when a low-delay service not supported by the low-delay base station 100 may be supported through the neighbor base station, the service list may include the low-delay service supported by the neighbor base station.

Figure 2:
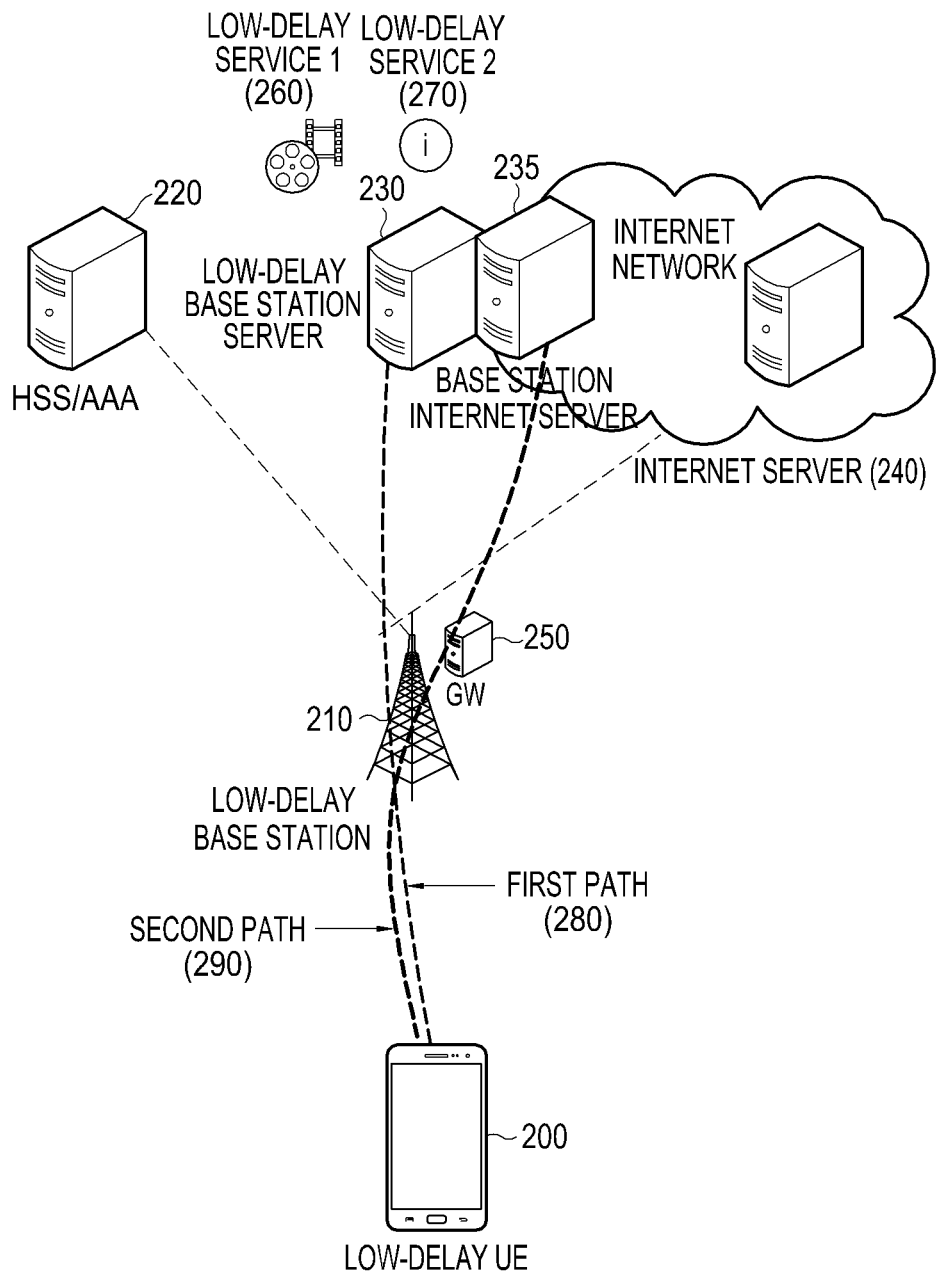
FIG. 2 is a view illustrating an example of a second structure of a low-delay providing system according to an embodiment of the present disclosure.

FIG. 2 is a view illustrating an example of a second structure of a low-delay providing system according to an embodiment of the present disclosure.

Referring to FIG. 2, the low-delay providing system generally includes a low-delay UE 200 and a low-delay network. The low-delay network provides a low-delay service 1 260 and a low-delay service 2 270 to the low-delay UE 200. Further, the low-delay network includes a low-delay base station 210, an HSS/AAA 220, a low-delay base station server 230, a base station Internet server 235, an Internet server 240, and a GW 250. The Internet server 240 is connected to the low-delay base station 210 through the GW 250.

The respective functions of the other entities than the base station Internet server 235, i.e., the low-delay UE 200, the low-delay base station 210, the HSS/AAA 220, the low-delay base station server 230, the Internet server 240, and the GW 250, have been described above in detail in connection with FIG. 1, and no detailed description thereof is given here.

The base station Internet server 235 is located in an Internet network and uses TCP/IP to provide a service requested by the low-delay UE 200. As an example, the base station Internet server 235 may be implemented in a piece of equipment, such as the low-delay base station server 230. As another example, the base station Internet server 235 may be implemented to connect to the low-delay base station server 230 through an internal interface. The MNO may properly use network address translation (NAT) to configure the base station Internet server 235. The low-delay UE 200 may access the base station Internet server 235 using a TCP/IP stack.

In the low-delay providing mode, the low-delay UE 200 sends a request for a service to the low-delay base station 210. The low-delay base station 210, when the service requested by the low-delay UE 200 is supported by the low-delay base station 210, provides the requested service, i.e., low-delay service 1 260 and/or low-delay service 2 270, to the low-delay UE 200 through a first path 280 shown.

In the fallback mode, the low-delay UE 200 sends a request for a service to the low-delay base station 210. The low-delay base station 210, when the service requested by the low-delay UE 200 is not supported by the low-delay base station 210, provides the requested service to the low-delay UE 200 through a second path 290. In the fallback mode, the low-delay UE 200 may access the base station Internet server 235 using the TCP/IP stack and may transfer information on the low-delay UE 200, i.e., information related to the low-delay UE 200, to the base station Internet server 235 through the internal interface.

In connection with the following embodiments of the present disclosure, there is described a method for providing a low-delay service with respect to the low-delay providing system shown in FIG. 1. However, the basic operational principle for providing a low-delay service as described in connection with embodiments of the present disclosure may be commonly used in the low-delay providing system shown in FIG. 1 and the low-delay providing system shown in FIG. 2.

Figure 3:
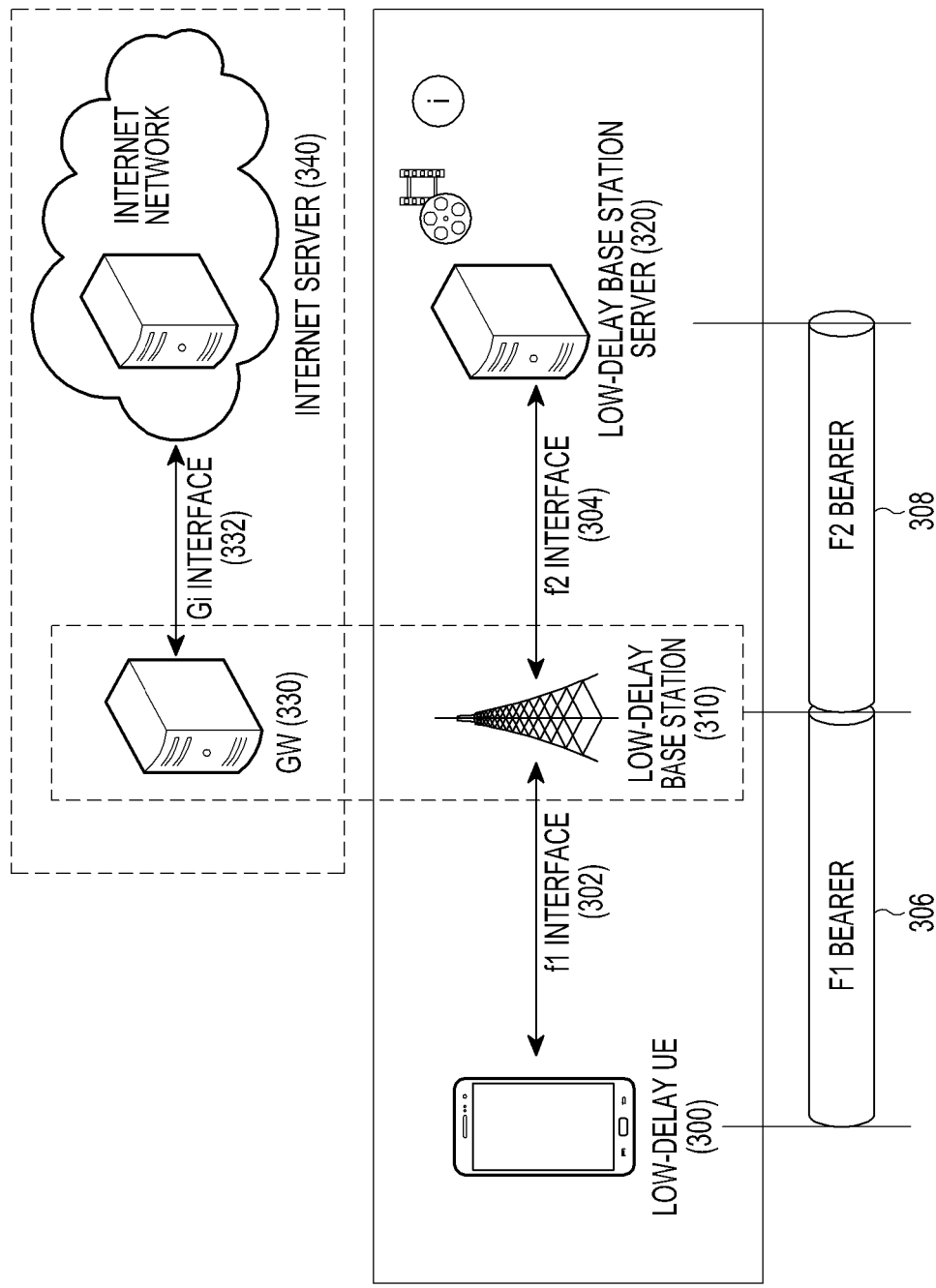
FIG. 3 is a view illustrating an example of a third structure of an interface and a bearer configured between components in a low-delay providing system according to an embodiment of the present disclosure.

FIG. 3 is a view illustrating an example of a third structure of an interface and a bearer configured between components in a low-delay providing system according to an embodiment of the present disclosure.

Referring to FIG. 3, the entities used to provide a low-delay service in the low-delay providing mode are denoted in solid lines, and the entities added to provide the service in the fallback mode are denoted in dashed lines.

The low-delay UE 300 and low-delay base station 310 used in the low-delay providing mode are connected through an f1 interface 302. The f1 interface 302 performs a function for registering the low-delay UE 300 in a low-delay network.

The low-delay base station 310 and a low-delay base station server 320 used in the low-delay providing mode are connected through an f2 interface 304. The f2 interface 304 performs a function for registering the low-delay UE 300 in the low-delay base station server 320, a function for activating a low-delay service to allow the low-delay UE 300 to receive the low-delay service, a function for updating context related to the low-delay service in the low-delay base station server 320, and a function for releasing the registration of the low-delay UE 300 from the low-delay base station server 320.

An F1 bearer, a radio bearer, is provided between the low-delay UE 300 and the low-delay base station 310, and an F2 bearer, a core bearer, is provided between the low-delay base station 310 and the low-delay base station server 320. Although the F1 bearer and the F2 bearer are used herein without differentiation on uplink/downlink, the process in which the F1 bearer and the F2 bearer each is established on uplink/downlink may basically adopt the method proposed herein.

The GW 330 and the Internet server 340 used in the fallback mode are connected through, e.g., a Gi interface 332. The Gi interface 332 is an interface used for connection of an existing LTE network to the GW 330 and an Internet network. The GW 330 may be directly connected with the low-delay base station 310. The GW 330 functions to allocate an IP address to the low-delay UE 300 so that the low-delay UE 300 may connect to the Internet network. In the LTE communication system, a packet data network (PDN) gateway (PGW) may play the same role as the GW 330.

Figure 4A:
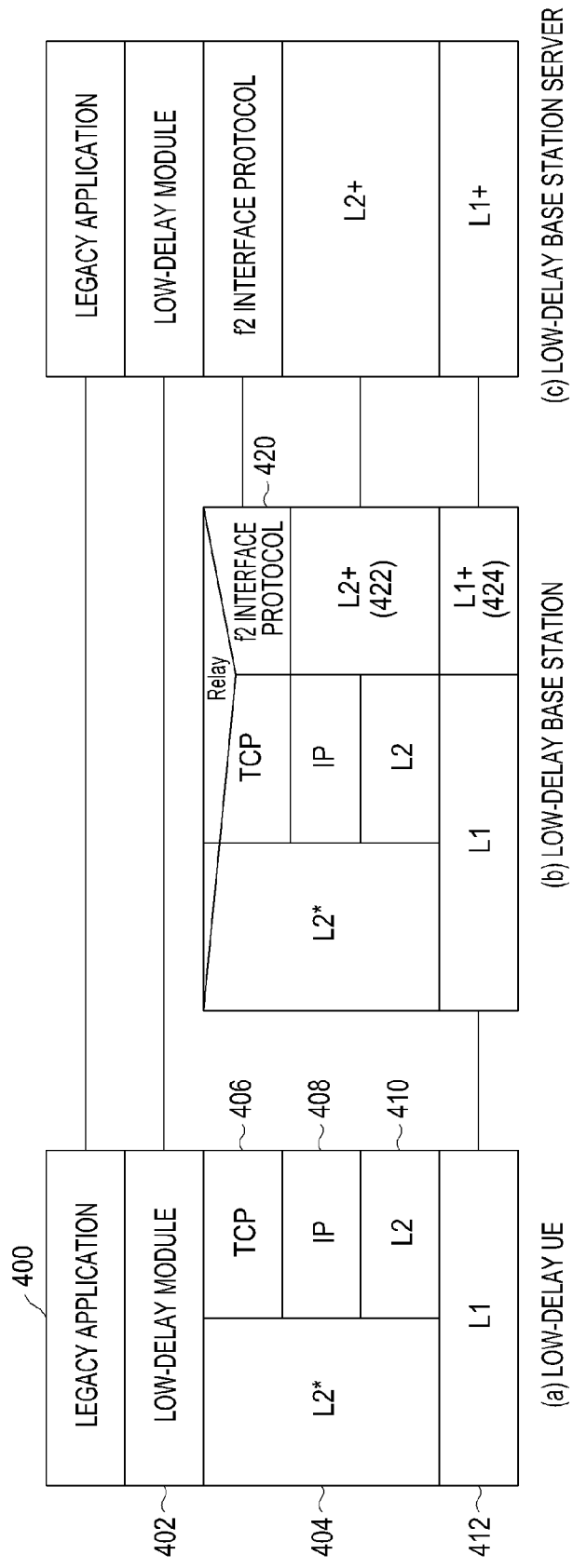
FIGS. 4A and 4B are views illustrating protocol stacks used by components in a low-delay providing system according to embodiments of the present disclosure.
Figure 4B:
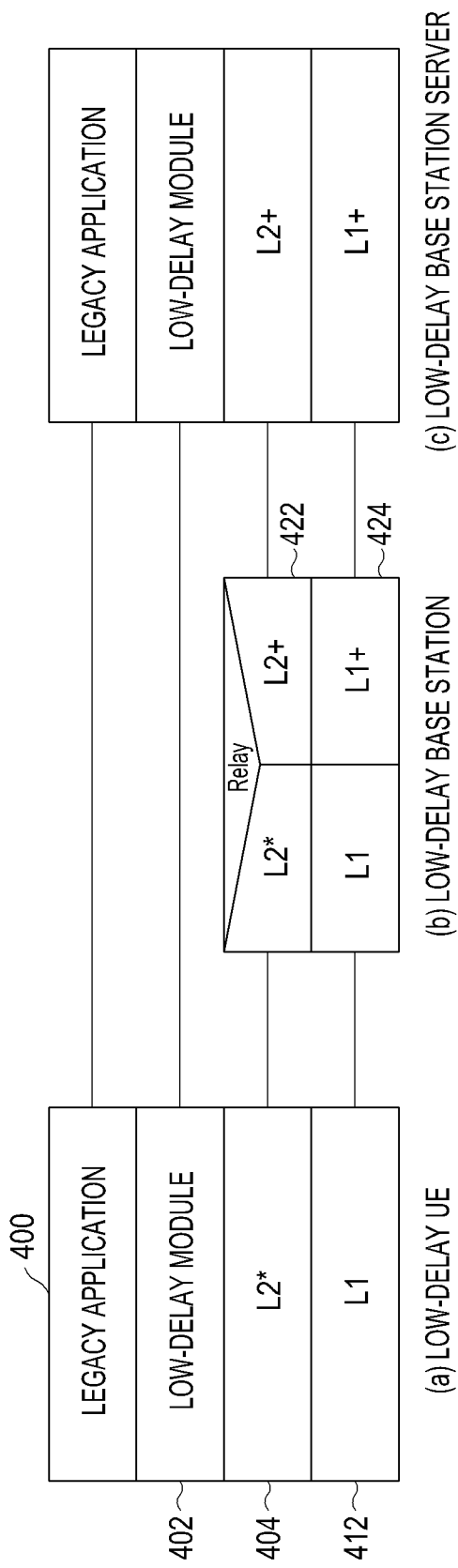

FIGS. 4A and 4B are views illustrating protocol stacks used by components in a low-delay providing system according to embodiments of the present disclosure.

Block (a) of FIG. 4A illustrates a protocol stack used by the low-delay UE, and block (b) of FIG. 4A illustrates a protocol stack used by a low-delay base station. Block (c) of FIG. 4A illustrates a protocol stack used by a low-delay base station server.

The protocol stack as shown in block (a) used by the low-delay UE includes a dual stack structure. That is, the protocol stack as shown in block (a) includes a stack for operating in the low-delay providing mode and a stack for operating in the fallback mode. Hereinafter, the stack for operating in the low-delay providing mode is referred to as a low-delay stack, and the stack for operating in the fallback mode is referred to as a fallback stack.

The low-delay stack constituting the protocol stack as shown in block (a) includes a legacy application layer 400, a low-delay module 402, a layer 2* (L2*) layer 404, and a layer 1 (L1) layer 412.

The legacy application layer 400 is the application layer used by a legacy UE, rather than a layer newly proposed to provide a low-delay service. That is, the legacy application layer 400 performs the same function as the application used by the legacy UE. Even a low-delay UE may use the legacy application layer. However, in order for the low-delay UE to use the legacy application, the low-delay module 402 is required that enables communication with the L2* layer 404, a low-delay access layer.

The low-delay module 402 functions to enable communication between the legacy application layer 400 and the L2* layer 404. That is, the low-delay module 402 transfers a request from the legacy application layer 400 to the L2* layer 404 and transfers a request from the L2* layer 404 to the legacy application layer 400. Further, the low-delay module 402 functions to determine whether to operate in the low-delay providing mode or in the fallback mode. The low-delay module 402 operates transparent to the legacy application layer 400. For example, the legacy application layer 400 recognizes the low-delay module 402 as an operation system (OS) of the UE.

The L2* layer 404 is a low-delay access layer and performs the same function as a legacy layer 2 (L2) layer. The L2* layer also performs a service connection management function between the low-delay UE and the low-delay base station server. That is, the L2* layer 404 performs all the functions performed by the legacy L2 layer and additionally performs a service connection management function between the low-delay UE and the low-delay base station server.

The L1 layer 412 is a physical layer and performs a wireless access function. The wireless access function may include, e.g., 5G air, LTE air, or wireless-fidelity (Wi-Fi) air function.

The fallback stack constituting the protocol stack (a) includes a legacy application layer 400, a low-delay module 402, a TCP layer 406, an IP layer 408, an L2 layer 410, and an L1 layer 412.

The legacy application layer 400, the low-delay module 402, and the L1 layer 412 are included in both the low-delay stack and the fallback stack. The low-delay module 402 transfers a request from the legacy application layer 400 to the TCP layer 406 and a request from the TCP layer 406 to the legacy application layer 400.

The TCP layer 406 and the IP layer 408 are transport layers and transfer a request from the legacy application layer 400 to the L2 layer 420.

The protocol stack as shown in block (b) used by the low-delay base station includes a portion for communication with the low-delay UE and a portion for communication with the low-delay base station server. The portion for communication with the low-delay UE is symmetrical with the L2* layer 404, TCP layer 406, IP layer 408, L2 layer 410, and L1 layer 412 used by the low-delay UE. The portion for communication with the low-delay base station server includes an f2 interface protocol layer 420, a layer 2+ (L2+) layer 422, and a layer 1+ (L1+) layer 424.

The f2 interface protocol layer 420 means a transfer protocol used in the f2 interface between the low-delay base station and the low-delay base station server, and as an example, may use the Ethernet.

According to an embodiment of the present disclosure, the protocol stack as shown in block (b) may be configured without the f2 interface protocol layer 420, i.e., only with the L2+ layer.

The L2+ layer 422 performs the same function as the legacy L2 layer. Although the low-delay base station communicates with the low-delay base station server using the L2+ layer 422, for example, the L2+ layer 422 may be replaced with the L2* layer or legacy L2 layer.

The L1+ layer 424 is a physical layer and performs a wireless access function.

The protocol stack as shown in block (c) used by the low-delay base station server includes a portion for communication with the low-delay base station and a portion for communication with the low-delay UE. The portion for communication with the low-delay base station is symmetrically with the f2 interface protocol layer 420, the L2+ layer 422, and the L1+ layer 424 used by the low-delay base station. The portion for communication with the low-delay UE is symmetrical with the legacy application layer 400 and the low-delay module 402 used by the low-delay UE.

FIG. 4A illustrates an example in which the protocol stacks used by the low-delay UE, low-delay base station, and low-delay base station server, each, include a stack for operation in the low-delay providing mode and a stack for operation in the fallback mode.

By contrast, FIG. 4B illustrates only a stack for operation in the low-delay providing mode in the protocol stacks used by the low-delay UE, low-delay base station, and low-delay base station serve. That is, when the low-delay UE, low-delay base station, and low-delay base station server each support one mode, i.e., only the low-delay providing mode, the protocol stack may be represented as shown in FIG. 4B.

Further, the stack for operation in the low-delay providing mode shown in FIG. 4B may also use an application for low-delay provided for a low-delay service, in addition to the embodiment where the legacy application 400 using the low-delay module 402 is used. When the application for low-delay comes in use, the low-delay module 402 may skip the function of mapping the legacy application 400 to the L2* layer 404.

Figure 5:
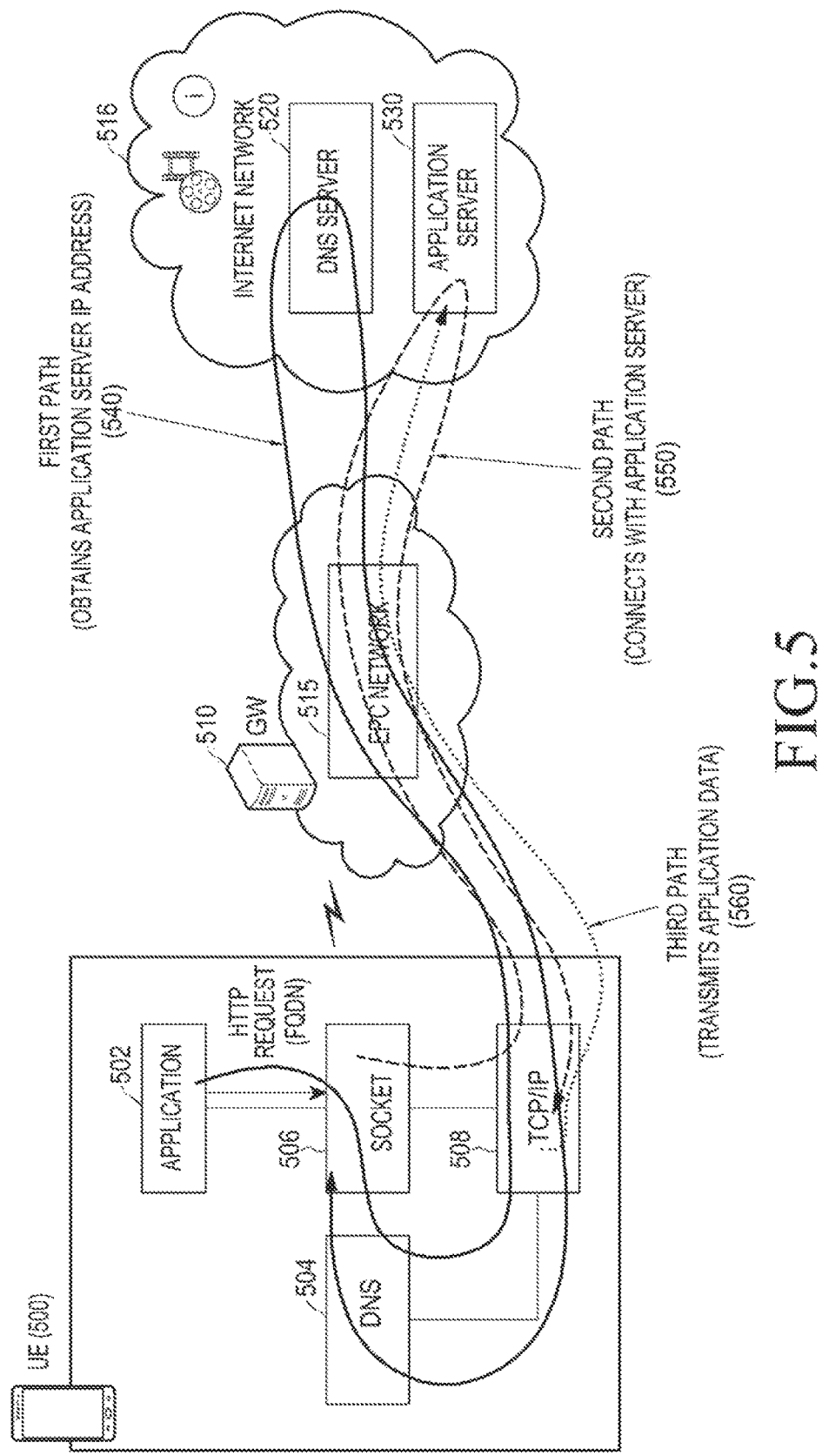
FIG. 5 is a view illustrating an example of transmitting application data from a UE to a server in a long term evolution (LTE) communication system.

FIG. 5 is a view illustrating an example of transmitting application data from a UE to a server in an LTE communication system.

Referring to FIG. 5, the LTE communication system includes a UE 500, a GW 510 located in an evolved packet core (EPC) network, a Domain Name System (DNS) server 520 located in an Internet network 515, and an application server 530. The UE 500 is assumed to be a legacy UE that does not support the low-delay protocol, and the application 502 is assumed to be installed on the UE 500. Further, the UE 500 is assumed to have already been connected with the DNS server 520 through a TCP/IP layer 508.

When the user executes the application 502 so that application data is generated, the UE 500 obtains the IP address of the application server 530 from the DNS server 520 through a first path 540 shown. That is, the application 502 includes a server name of a fully qualified domain name (FQDN) type in a hypertext transfer protocol (HTTP) request message and transmits the same to a socket 506. The socket 506 sends a request for the IP address of the application server 530 to the DNS server 520 and obtains the IP address from the DNS server 520.

When obtaining the IP address of the application server, the socket 506 establishes a connection with the application server 530 through a second path 550 shown. That is, the socket 506 establishes a connection with the application server 530 through the TCP/IP layer 508. Thereafter, the UE 500 transmits first application data to the application server 530 using the TCP/IP layer 508 through a third path 560 shown. Here, the first application data means application data generated as the user executes the application 502, and as an example, may be an HTTP GET message. The first path 540 to third path 560 all pass through the EPC network 515.

Figure 6:
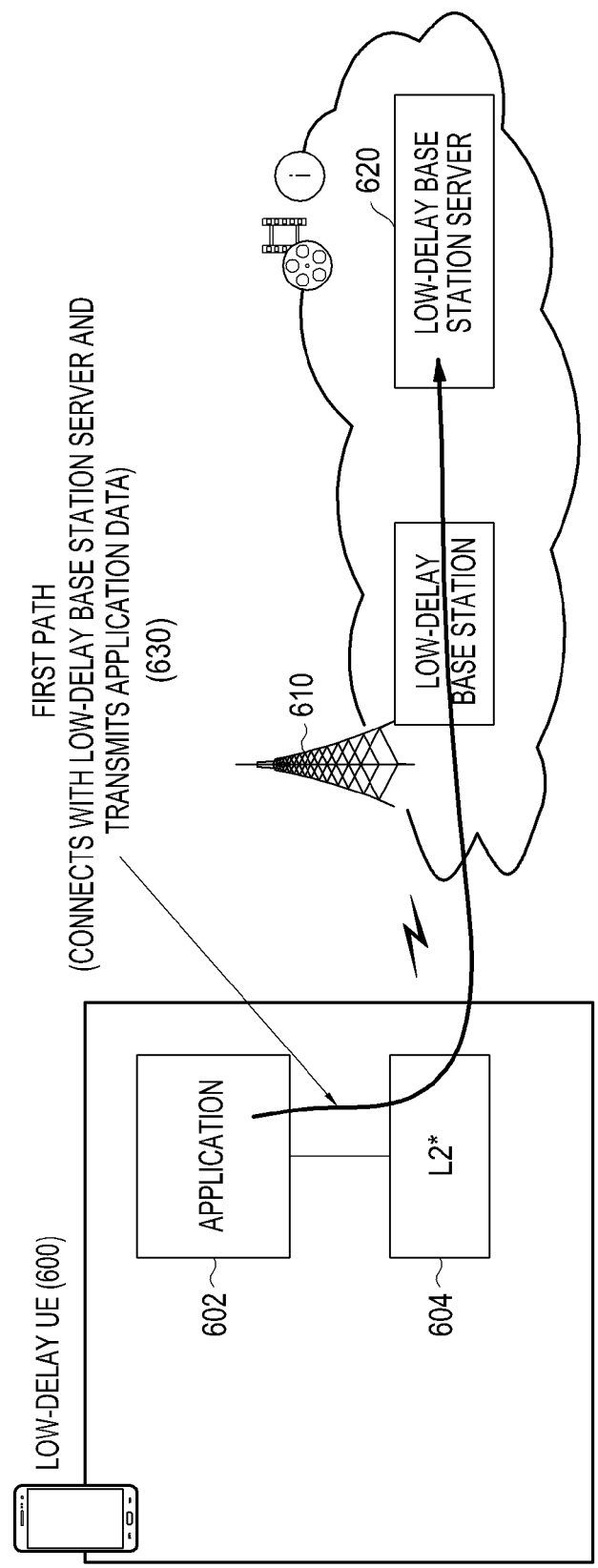
FIG. 6 is a view illustrating an example of transmitting application data from a low-delay UE to a low-delay base station server in a low-delay providing system according to an embodiment of the present disclosure.

FIG. 6 is a view illustrating an example of transmitting application data from a low-delay UE to a low-delay base station server in a low-delay providing system according to an embodiment of the present disclosure.

Referring to FIG. 6, the low-delay providing system includes a low-delay UE 600, a low-delay base station 610, and a low-delay base station server 620. It is assumed that the low-delay UE 600 and the low-delay base station 610 both support a low-delay protocol and that an application 602 is installed on the low-delay UE 600. The low-delay base station server 620 is assumed to be an application server that is connected with the low-delay base station 610 and provides the low-delay service to the low-delay UE 600 through the low-delay base station 610.

When the application data is generated by the user executing the application 602, the low-delay UE 600 establishes a connection with the low-delay base station server 620 like along a first path 630 and transmits the generated application data, i.e., first application data, to the low-delay base station server 620.

While the UE 500 of FIG. 5 transmits application data through the first path 540 to third path 560 in the LTE communication system of FIG. 5, the low-delay UE 600 in the low-delay providing system of FIG. 6 may transmit application data through the first path 630 only. Thus, the low-delay providing system may significantly reduce the time required for transmission of application data.

Meanwhile, the low-delay base station 610, when receiving the application data from the low-delay UE 600, identifies whether the application data is data related to a low-delay service. The low-delay base station 610 may identify the low-delay service with the service name included in the service connection request message received from the low-delay UE 600 or may identify the low-delay service with a service identity (ID) and the service name included in the service connection request message. Here, the service ID indicates an address of the low-delay base station server 620. The low-delay base station server 610, when identifying that the application data is data related to the low-delay service, determines the low-delay base station server 620 supporting the low-delay service and connects with the low-delay UE 600.

Figure 7:
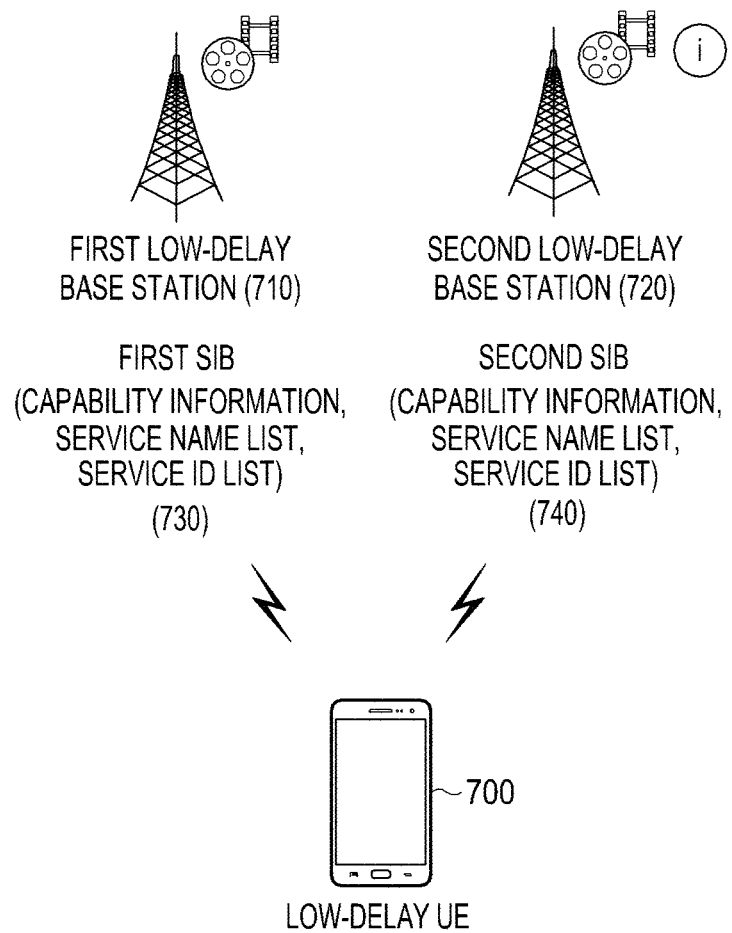
FIG. 7 is a view illustrating an example of obtaining information related to a low-delay service by a low-delay UE in a low-delay providing system according to an embodiment of the present disclosure.

FIG. 7 is a view illustrating an example of obtaining information related to a low-delay service by a low-delay UE in a low-delay providing system according to an embodiment of the present disclosure.

Referring to FIG. 7, the low-delay providing system includes a low-delay UE 700, a first low-delay base station 710, and a second low-delay base station 720. It is assumed that the low-delay UE 700, the first low-delay base station 710, and the second low-delay base station 720 all support a low-delay protocol.

The first and second low-delay base stations 710 and 720 broadcast information related to the low-delay service supported by them to allow the low-delay UE 700 to obtain information related to the low-delay service. That is, the first low-delay base station 710 and the second low-delay base station 720, each includes information related to the low-delay service in a system information block (SIB) and broadcasts the same to thereby transfer the information related to the low-delay service to the low-delay UE 700.

The first low-delay base station 710 includes information related to the low-delay service provided by the first low-delay base station 710 in a first SIB 730 and broadcasts the same. The second low-delay base station 720 includes information related to the low-delay service provided by the second low-delay base station 720 in a second SIB 740 and broadcasts the same.

The information related to the low-delay service may include, e.g., at least one of base station capability information, a service name list, and a service ID list. Here, the base station capability information is information indicating whether the base station is a low-delay base station. The service name list is a list of the respective names of low-delay services supported by the base station. The service name may be, e.g., an FQDN. Further, the service ID list is a list of IDs respectively corresponding to low-delay services included in the service name list.

As such, the low-delay UE 700 may obtain the information related to the low-delay service through the SIB broadcast from the first low-delay base station 710 and/or second low-delay base station 720. An operation in which a base station broadcasts information related to a low-delay service to a UE through an SIB is herein described as an example. However, the information related to the low-delay service may also be transmitted to the UE through any other messages than the SIB.

Alternatively, the low-delay UE 700 may obtain the information related to the low-delay service from the first low-delay base station 710 and/or second low-delay base station 720 through the process of first accessing the low-delay providing system.

Meanwhile, the information related to the low-delay service is stored in a low-delay module (e.g., the low-delay module 402 of FIG. 4A and FIG. 4B) of the low-delay UE 700 and is used when it is determined whether the low-delay UE 700 operates in the low-delay providing mode or in the fallback mode.

Figure 8:
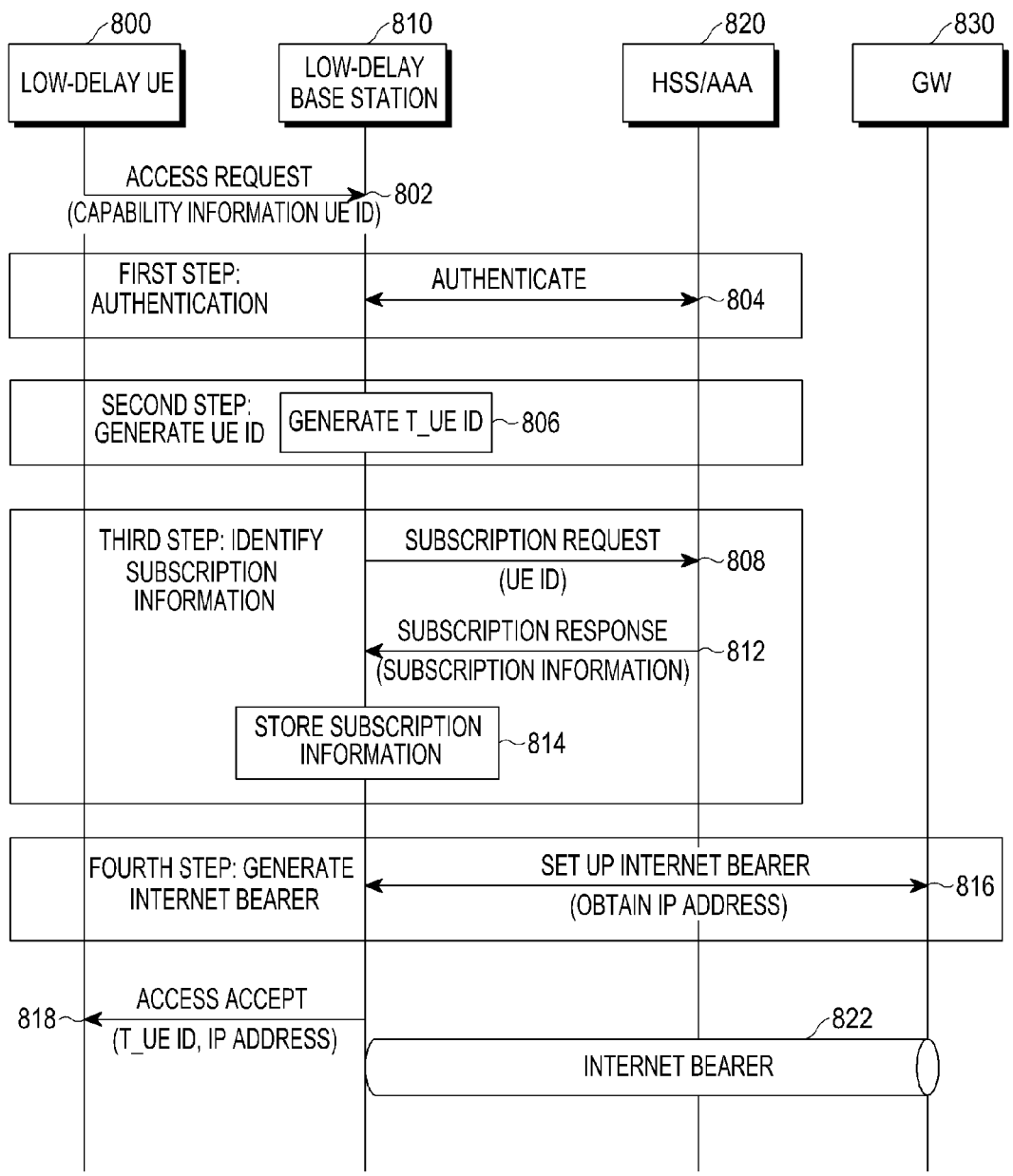
FIG. 8 is a view illustrating an example in which a low-delay UE accesses a low-delay providing system in the low-delay providing system according to an embodiment of the present disclosure.

FIG. 8 is a view illustrating an example in which a low-delay UE accesses a low-delay providing system in the low-delay providing system according to an embodiment of the present disclosure.

Referring to FIG. 8, the low-delay providing system includes a low-delay UE 800, a low-delay base station 810, an HSS/AAA 820, and a GW 830.

The low-delay UE 800 may obtain information related to a low-delay service by first accessing the low-delay providing system. The process in which the low-delay UE 800 accesses the low-delay providing system largely includes four steps, i.e., an authentication step (first step), a UE identity generation step (second step), a subscription information identification step (third step), and an Internet bearer generation step (fourth step). Of course, the process in which the low-delay UE 800 accesses the low-delay providing system may include additional steps other than the above-mentioned steps.

The low-delay UE 800 transmits, to the low-delay base station 810, an access request message for requesting access to the low-delay providing system (step 802). The access request message includes UE capability information and a user equipment (UE) ID (UE ID) and additionally includes information indicating whether the UE may operate in the fallback mode. The UE capability information is information indicating whether the UE requesting access (e.g., the low-delay UE 800) is a low-delay UE having a low-delay stack for operating in the low-delay providing mode. The UE ID may be, e.g., a media access control (MAC) address, an international mobile equipment identity (IMEI), or an ID assigned by the mobile operator to the user when the user subscribes to the service.

When receiving the access request message from the low-delay UE 800, the low-delay base station 810 performs authentication with the HSS/AAA 820 (step 804). That is, the low-delay base station 810 authenticates the low-delay UE 800 through the HSS/AAA 820 using the UE ID included in the access request message.

The low-delay base station 810 generates a temporary UE ID (T_UE ID) to be assigned to the authenticated low-delay UE 800 (step 806). The low-delay base station 810 combines its unique ID (base station ID, BS ID) with the UE ID to generate the T_UE ID. The T_UE ID may be available only when the low-delay UE 800 is attached to the low-delay providing system. Further, the low-delay base station 810 transmits, to the HSS/AAA 820, a subscription request message for requesting the subscription information of the low-delay UE 800 (step 808). The subscription request message contains the UE ID of the low-delay UE 800.

The HSS/AAA 820 transmits a subscription response message to the low-delay base station 810 in response to the subscription request message (step 812). The subscription response message contains the subscription information of the low-delay UE 800. Here, the subscription information is a list of low-delay services to which the low-delay UE 800 subscribes, for example, and may include the Quality of Service (QoS) of each service to which the low-delay UE 800 subscribes, the name of each low-delay service, and a category name collectively referring to a plurality of low-delay services. The low-delay base station 810 stores the subscription information of the low-delay UE 800 received from the HSS/AAA 820 (step 814).

The low-delay base station 810 establishes an Internet bearer with the GW 830 and obtains an IP address through the established Internet bearer (step 816). The obtained IP address is used for connection with the Internet server when the low-delay UE 800 operates in the fallback mode. Further, the low-delay base station 810 transmits an access accept message to the low-delay UE 800 in response to the access request message received in step 802 (step 818). The access accept message includes the IP address obtained in step 816 and the T_UE ID generated in step 806. Accordingly, the Internet bearer establishment between the low-delay base station 810 and the GW 830 is complete (step 822). An example of the Internet bearer may be, e.g., a default EPS for LTE communication systems.

Figure 9:
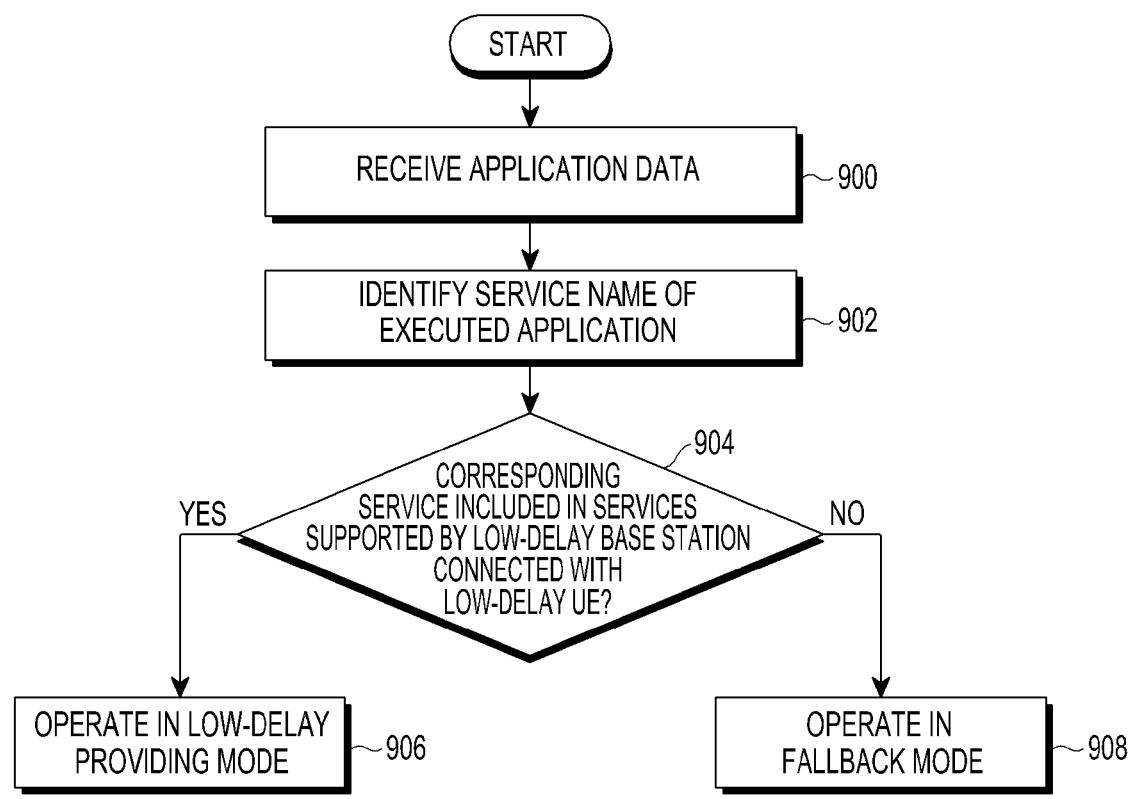
FIG. 9 is a flowchart illustrating an example of a process in which a low-delay module determines an operation mode in an operation mode in a low-delay providing system according to an embodiment of the present disclosure.

FIG. 9 is a flowchart illustrating an example of a process in which a low-delay module (similar to the low-delay modules 402 of FIG. 4A and FIG. 4B) determines an operation mode in an operation mode in a low-delay providing system according to an embodiment of the present disclosure.

Referring to FIG. 9, the low-delay module receives application data generated as the user executes an application (similar to applications discussed above, including, e.g., the application 602 of FIG. 6) in step 900. The low-delay module identifies a service name of the executed application in step 902. The low-delay module, when the UE installs the application, may extract a service name corresponding to the application or may obtain the service name from an Internet server providing a service to the UE.

In step 904, the low-delay module identifies whether a corresponding service, i.e., a service indicated by the identified service name is included in services supported by the low-delay base station attached to the UE and determines an operation mode depending on a result of the determination. That is, the low-delay module, when the corresponding service is included in the services supported by the low-delay base station attached to the UE, proceeds to step 906 to operate in the low-delay providing mode. In such case, the low-delay module operating in the low-delay providing mode transmits a service request message to the low-delay base station server to request a related service.

However, unless the corresponding service is included in the services supported by the low-delay base station attached to the UE, the low-delay module goes to step 908 to operate in the fallback mode. In this case, the low-delay module operating in the fallback mode transmits a service request message to the Internet server to request a related service.

Figure 10:
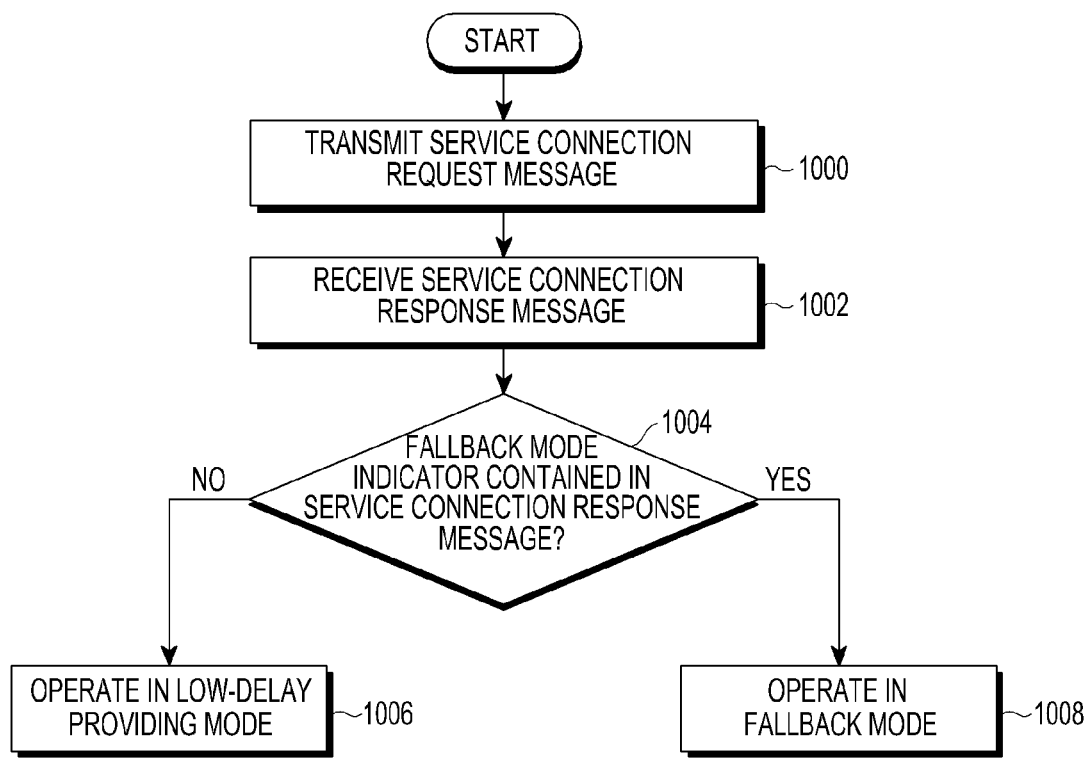
FIG. 10 is another flowchart illustrating an example of a process in which a low-delay module determines an operation mode in an operation mode in a low-delay providing system according to an embodiment of the present disclosure.

FIG. 10 is another flowchart illustrating an example of a process in which a low-delay module (similar to the low-delay modules 402 of FIG. 4A and FIG. 4B) determines an operation mode in an operation mode in a low-delay providing system according to an embodiment of the present disclosure.

Referring to FIG. 10, the low-delay module transmits a service connection request message to the network to request a service connection in step 1000. In step 1002, the low-delay module receives a service connection response message from the network in response to the service connection request message.

In step 1004, the low-delay module identifies whether the service connection response message contains a fallback mode indicator indicating to operate in the fallback mode and determines an operation message depending on a result of the identification. That is, the low-delay module, when the service connection response message contains the fallback mode indicator, proceeds to step 1008 to operate in the fallback mode. In this case, the low-delay module operating in the fallback mode transmits a service request message to the Internet server to request a related service.

However, the low-delay module, unless the service connection response message contains the fallback mode indicator, proceeds to step 1006 to operate in the low-delay providing mode. In such case, the low-delay module operating in the low-delay providing mode transmits a service request message to the low-delay base station server to request a related service.

Figure 11A:
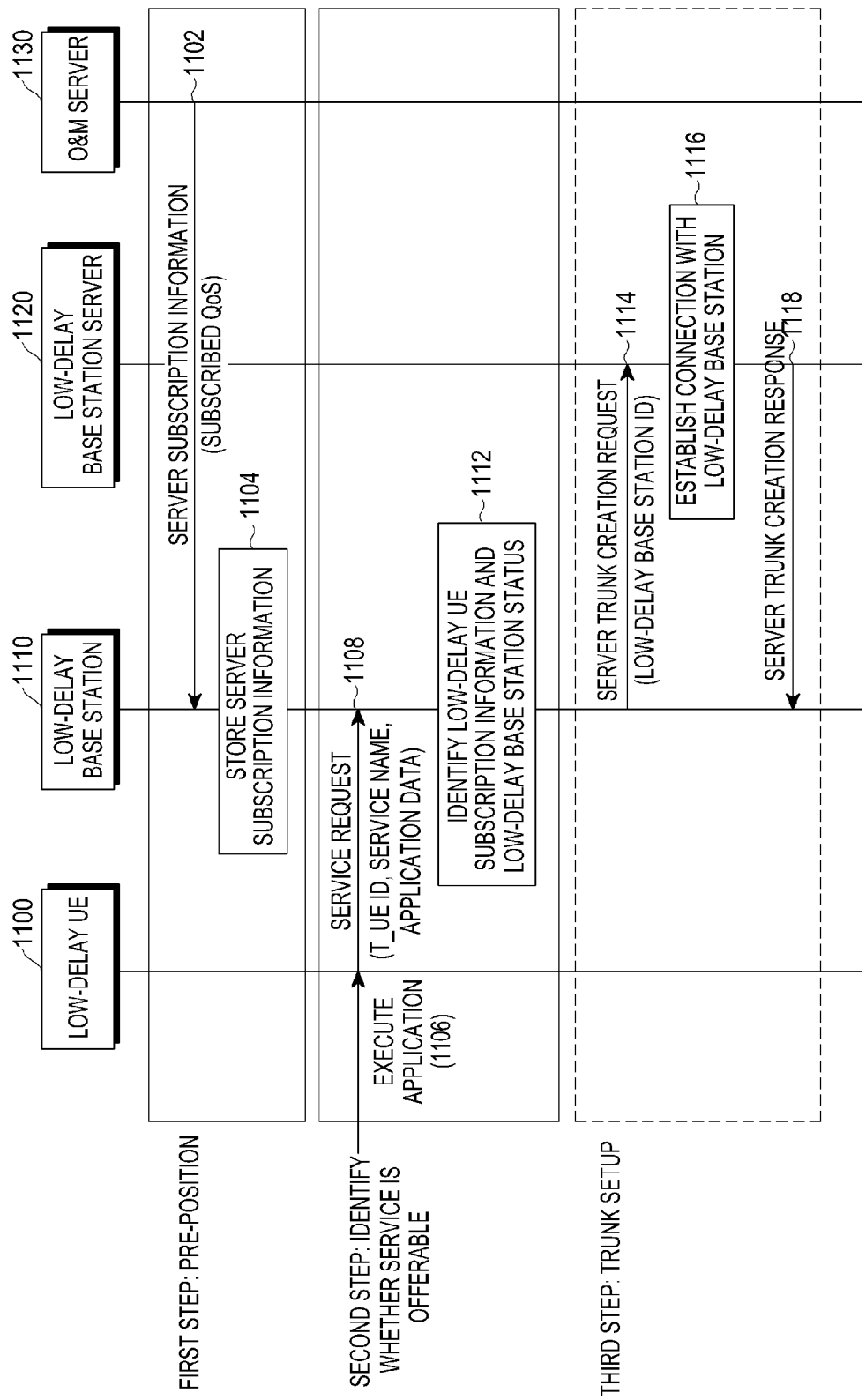
FIGS. 11A and 11B are views illustrating examples of procedures in which a low-delay UE operating in a low-delay providing mode communicates application data with a low-delay base station server in a low-delay providing system according to embodiments of the present disclosure.
Figure 11B:
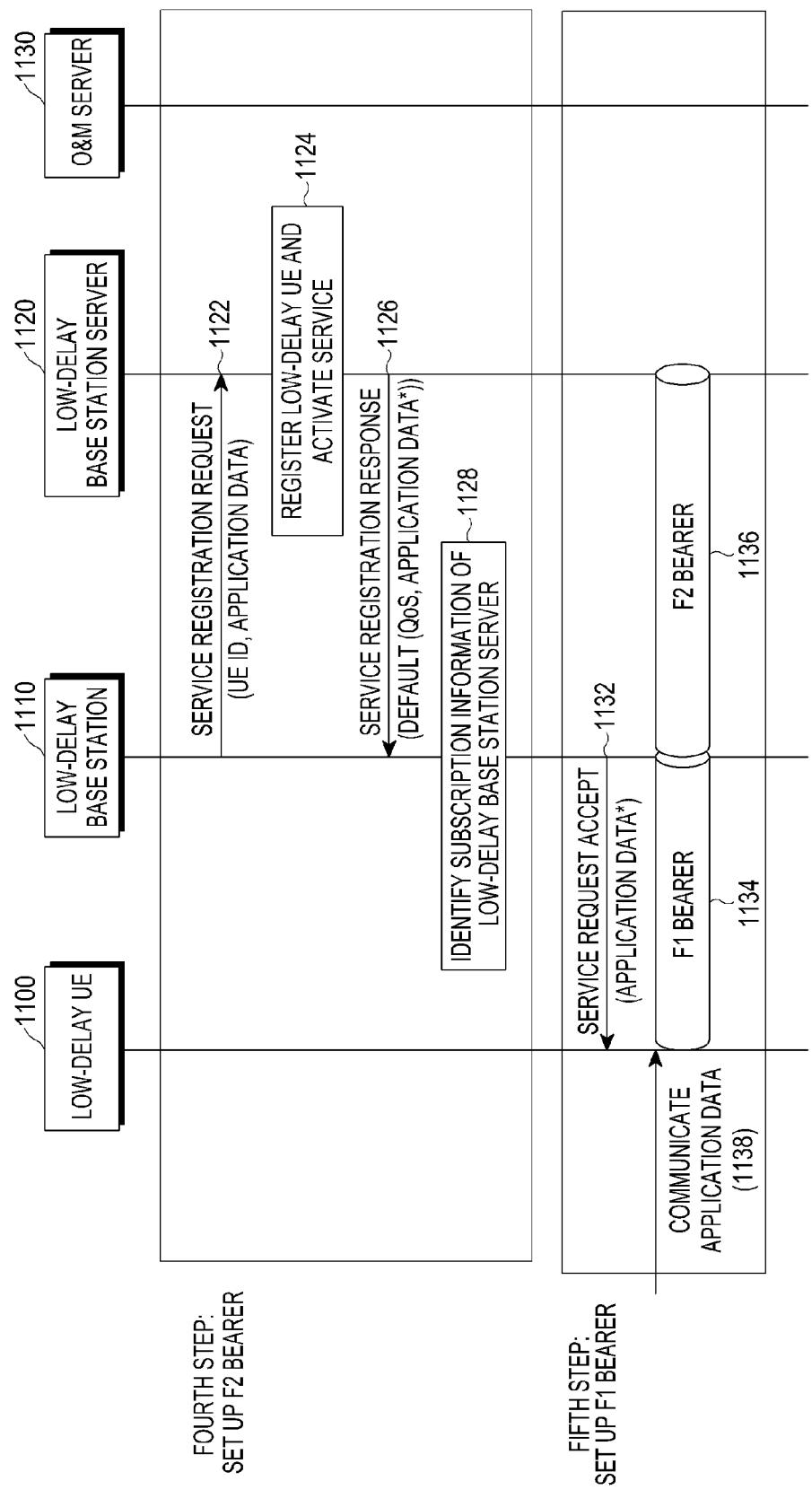

FIGS. 11A and 11B are views illustrating examples of procedures in which a low-delay UE operating in a low-delay providing mode communicates application data with a low-delay base station server in a low-delay providing system according to embodiments of the present disclosure.

Referring to FIGS. 11A and 11B, the low-delay providing system includes a low-delay UE 1100, a low-delay base station 1110, a low-delay base station server 1120, and an operation and management (O&M) server 1130.

The process in which the low-delay UE 1100 communicates application data with the low-delay base station server 1120 largely includes five steps, i.e., a pre-position step (first step), the step (second step) of identifying whether a service is offerable, a trunk setup step (third step), an F2 bearer setup step (fourth step), and an F1 bearer setup step (fifth step). Here, the trunk setup step may be optionally omitted in some cases. That is, the trunk setup step may be optionally omitted when a connection has been already established between the low-delay base station 1110 and the low-delay base station server 1120. Further, the trunk setup step may be performed together with the pre-position step as is often case.

The O&M server 1130 transmits server subscription information to the low-delay base station 1110 (step 1102). The server subscription information includes information related to the low-delay base station server 1120 and subscribed QoS. Here, the subscribed QoS means a QoS to which the low-delay base station server 1120 subscribes for providing a low-delay service, and may be, e.g., a minimum bandwidth necessary to provide a low-delay service. The server subscription information is transmitted when the low-delay base station server 1120 is installed or when the low-delay base station server 1120 is connected to the low-delay base station 1110. The server subscription is also transmitted when previously transmitted server subscription information is modified.

The low-delay base station 1110 stores the server subscription information transmitted in step 1102 and thereafter updates the pre-stored information according to server subscription information additionally transmitted.

When the user executes an application installed on the low-delay UE 1100 (step 1106), the low-delay UE 1100 transmits a service request message to the low-delay base station 1110 to request a connection with the low-delay base station server 1120 (step 1108). The service request message includes a T_UE ID, a service name, and first application data generated by the execution of the application in step 1106. Here, the service name indicates a service desired to be used by the low-delay UE 1100 and is stored in the low-delay UE 1100. Further, the low-delay base station 1110 provides the service name to the low-delay UE 1100 by broadcasting, and may search for a server to which to be connected, i.e., the low-delay base station server 1120, through the service name. An example of the first application data may be an HTTP GET message.

The low-delay base station 1110 identifies the status of the low-delay base station 1110 and the subscription information of the UE for the service requested by the low-delay UE 1100 based on the service name contained in the service request message (step 1112). Further, the low-delay base station 1110 identifies whether a connection with the low-delay base station server 1120 is established, and when no connection is established, transmits a server trunk creation request message for establishing a connection to the low-delay base station server 1120 (step 1114). The server trunk creation request message contains a low-delay base station ID.

The low-delay base station server 1120 establishes a connection with the low-delay base station server 1110 (step 1116) and transmits a server trunk creation response message to the low-delay base station 1110 to accept the server trunk creation request (step 1118). As such, a connection is established between the low-delay base station 1110 and the low-delay base station server 1120 through the trunk setup step (third step) including steps 1114 to 1118.

The low-delay base station 1110 transmits a service registration request message to the low-delay base station server 1120 to request a service connection (step 1122). The service registration request message includes the UE ID and the first application data received in step 1108.

The low-delay base station server 1120 registers the low-delay UE 1100 and activates the service using the information received in step 1108 (step 1124). Here, the service activation process includes the process of generating session information by the low-delay base station server 1120 to establish a service connection. Further, the low-delay base station server 120 transmits a service registration response message to the low-delay base station 1110 in response to the service registration request message (step 1126). The service registration response message includes a default QoS and the first application data*. Here, the first application data* contains the response of the low-delay base station server 1120 to the first application data transmitted in steps 1108 and 1122. The first application data* is distinct from the first application data. Further, the default QoS is described below in detail in connection with FIG. 12.

The low-delay base station 1110 identifies the subscription information of the low-delay base station server 1120 based on the QoS requested by the low-delay base station server 1120 (step 1128). In this case, when the QoS requested by the low-delay base station server 1120 complies with the subscription information of the low-delay base station server 1120, an F2 bearer is established between the low-delay base station 1110 and the low-delay base station server 1120 (step 1136). Further, the low-delay base station 1110 transmits a service request accept message to the low-delay UE 1100 in response to the service request message transmitted in step 1108 (step 1132). The service request accept message contains the first application data* transmitted in step 1126. Further, an F1 bearer is established between the low-delay UE 1100 and the low-delay base station 1110 (step 1134).

Thereafter, the low-delay UE 1100 communicates application data through the F1 and F2 bearers (step 1138). Although marks are made in the direction in which the low-delay UE 1100 transmits application data as shown in FIGS. 11A and 11B, the case may also be possible in which application data is received from the low-delay base station server 1120 without an additional request from the low-delay UE 1100.

In step 1108, the low-delay UE 1100 informs the low-delay base station 1110 of the service that the low-delay UE 1100 intends to use by sending a service name to the low-delay base station 1110. The low-delay base station 1110 may be aware of the low-delay base station server 1120 to which the low-delay base station 1110 should establish a connection through the service name.

Meanwhile, when the low-delay UE 1100 and the low-delay base station server 1120 use one service session for a low-delay service, the low-delay UE 1100 may distinguish the service session only with the service name. However, when the low-delay UE 1100 and the low-delay base station server 1120 use a plurality of service sessions for a low-delay service, the low-delay UE 1100 may distinguish each of the plurality of service sessions with instance IDs. In such case, the service request message includes a service instance ID in addition to the T_UE ID, service name, and application data.

Further, when a plurality of low-delay base station servers (similar to the low-delay base station server 1120) providing the same service are connected with the low-delay base station 1110, the plurality of low-delay base station servers each may be distinguished with service IDs. In such case, the service request message includes a service ID in addition to the T_UE ID, service name, and application data.

The following Table 2 represents example service request messages used by the f2 interface when the low-delay UE 1100 and the low-delay base station server 1120 use a plurality of service sessions for a low-delay service or when a plurality of base station servers provide the same service. Here, the f2 interface means an interface connecting the low-delay base station with the low-delay base station server.

TABLE 2

| T_UE ID | Service name | Service instance ID | Service ID | Application data |
| --- | --- | --- | --- | --- |

That is, the service request message includes the T_UE ID, a service name, a service instance ID, a service ID, and application data.

The service name, service instance ID, and service ID may be referred to as service information.

Figure 12:
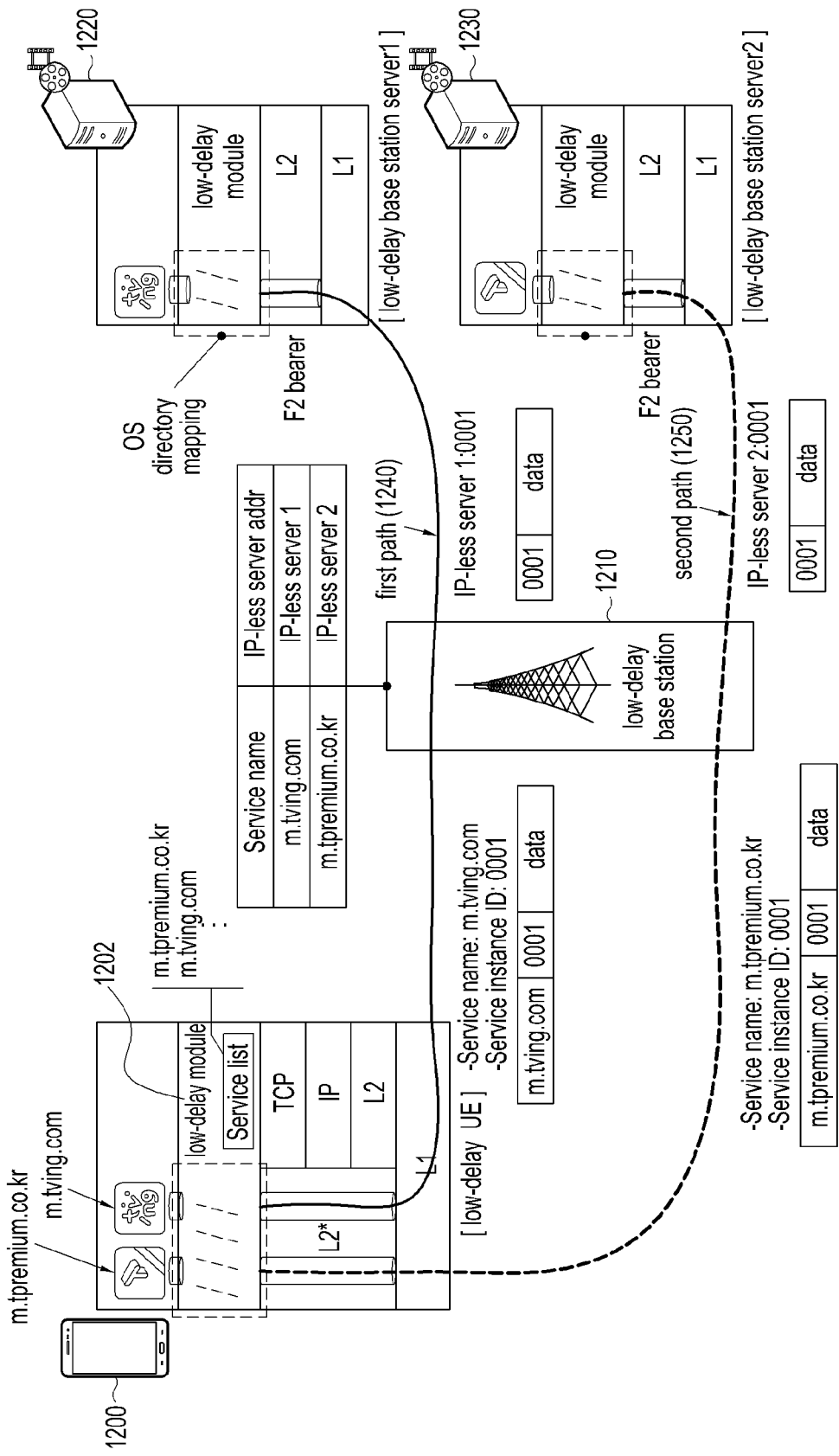
FIG. 12 is a view illustrating an example in which a low-delay UE transmits a service request message to a low-delay base station server based on service information in a low-delay providing system according to an embodiment of the present disclosure.

FIG. 12 is a view illustrating an example in which a low-delay UE transmits a service request message to a low-delay base station server based on service information in a low-delay providing system according to an embodiment of the present disclosure.

Referring to FIG. 12, the low-delay providing system includes a low-delay UE 1200, a low-delay base station 1210, and a low-delay base station server 1 1220, and a low-delay base station server 2 1230. It is assumed that the low-delay UE 1200 and the low-delay base station 1210 both support a low-delay protocol and that a plurality of applications are installed on the low-delay UE 1200. In connection with FIG. 12, it is assumed for ease of description that a T premium application and a TVing application are installed on the low-delay UE 1200, for example.

The low-delay base station server 1 1220 and low-delay base station server 2 1230 are assumed to be application servers that are connected with the low-delay base station 1210 and provides the low-delay service to the low-delay UE 1200 through the low-delay base station 1210.

Further, it is assumed that a low-delay module 1202 stores a service list of low-delay services to which the low-delay UE 1200 subscribes and that the low-delay base station 1210 stores mapping information in which the service name of the service supported by the low-delay base station 1210 is mapped with the address of the low-delay base station server providing a related service.

For example, when the user executes the TVing application, the low-delay UE 1200 transmits, to the low-delay base station 1210, a service request message including the service name (m.tving.com) of the TVing application, the service instance ID 0001, and application data. The low-delay base station 1210 searches for the address of the low-delay base station server providing the m.tving.com service based on the mapping information of the low-delay base station server and the pre-stored service name and transfers the application data of the low-delay UE 1200 to the searched low-delay base station server, the low-delay base station server 1 1220. That is, the low-delay UE 1200 transmits, to the low-delay base station server 1 1220, the application data generated by executing the TVing application through a first path 1240 shown.

As another example, when the user executes the T premium application, the low-delay UE 1200 transmits, to the low-delay base station 1210, a service request message including the service name (m.tpremium.co.kr) of the T premium application, the service instance ID 0001, and application data. The low-delay base station 1210 searches for the address of a low-delay base station server providing the m.tpremium.co.kr service based on the mapping information of the low-delay base station server and the pre-stored service name and transfers the application data of the low-delay UE 1200 to the searched low-delay base station server, the low-delay base station server 2 1230. That is, the low-delay UE 1200 transmits, to the low-delay base station server 2 1230, the application data generated by executing the T premium application through a second path 1250 shown.

Figure 13:
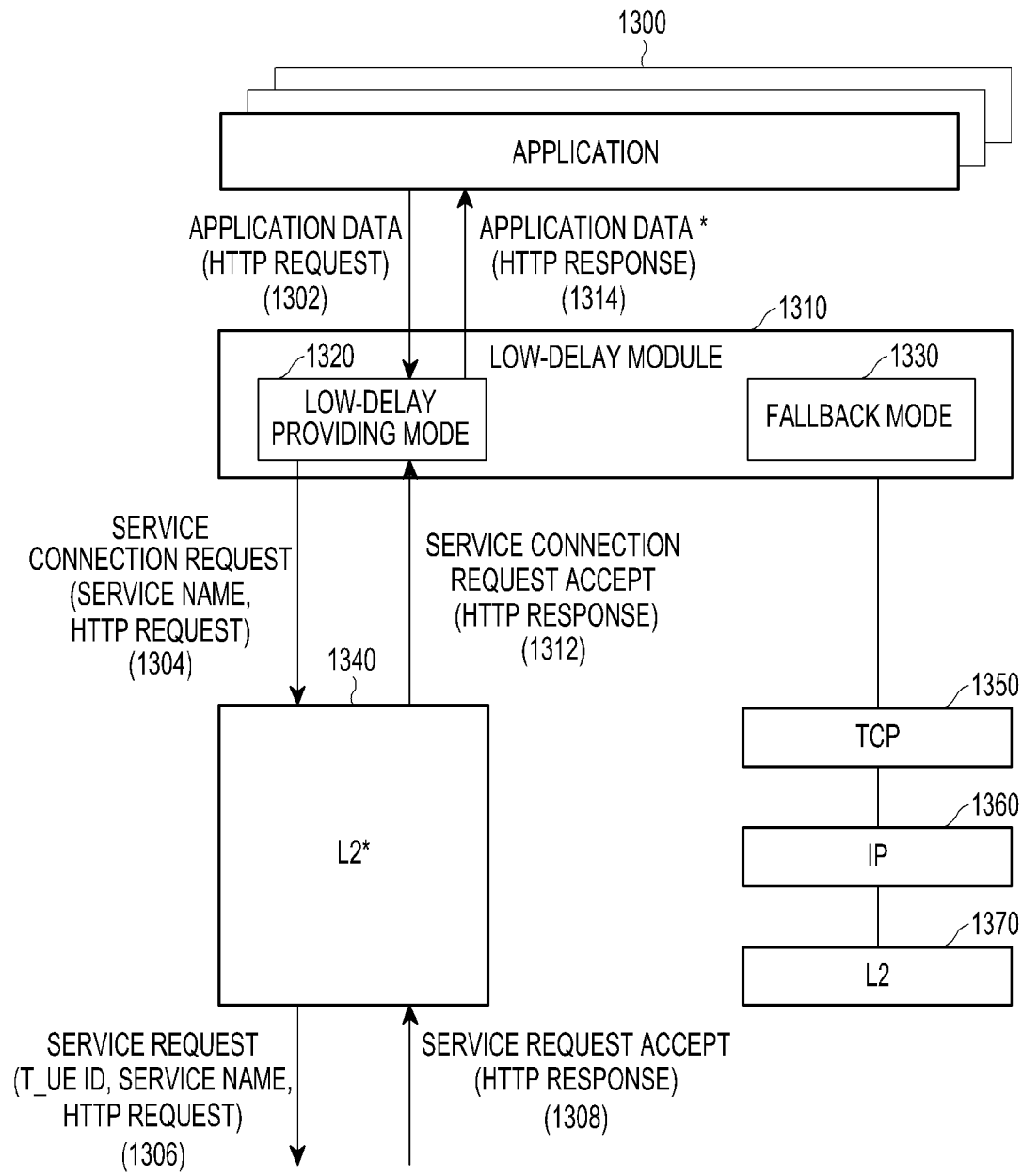
FIG. 13 is a view illustrating an example of an internal operation of a low-delay UE that operates in a low-delay providing mode to communicate application data with a low-delay base station server in a low-delay providing system according to an embodiment of the present disclosure.

FIG. 13 is a view illustrating an example of an internal operation of a low-delay UE that operates in a low-delay providing mode to communicate application data with a low-delay base station server in a low-delay providing system according to an embodiment of the present disclosure.

Referring to FIG. 13, when first application data is generated as the user executes an application 1300 (e.g., to request a low-delay service), the first application data is transferred to a low-delay module 1310. Here, the first application data may be, e.g., an HTTP request message.

The low-delay module 1310 identifies whether the low-delay service requested by the user is supported by the low-delay base station based on the low-delay service list received from the low-delay base station that is currently connected with the low-delay UE. Here, the low-delay module 1310 is assumed to operate in a low-delay providing mode 1320 as default. The low-delay module 1310, when the low-delay service requested by the user is supported by the low-delay base station, transmits a service connection request message to the L2* layer 1340 to request to establish a service connection with the low-delay base station server (step 1304). The service connection request message contains a service name and the HTTP request received in step 1302. The low-delay module 1310, when the application 1300 is installed, may be aware of the service name corresponding to the application.

The L2* layer 1340 transmits a service request message to the low-delay base station to perform connection establishment with the low-delay base station server (step 1306). The service request message includes the T_UE ID, service name, and the HTTP request received in step 1204. Further, the L2* layer 1340 receives a service request accept message from the low-delay base station in response to the service request message (step 1308). The service request accept message includes an HTTP response. Here, the HTTP response means application data* containing the application data transmitted from the low-delay base station server in response to the HTTP request, i.e., a response from the low-delay base station server.

The L2* layer 1340 transmits a service connection request accept message to the low-delay module 1310 in response to the service connection request message transmitted in step 1304 (step 1312). The service connection request accept message contains the HTTP response received in step 1308. The low-delay module 1310 transmits the HTTP response received in step 1312, i.e., the application data*, to the application 1300 (step 1314).

The following Table 3 represents example messages communicated between the low-delay module 1310 and the L2* layer 1340.

TABLE 3

| Service connection request message |
| Service connection request accept message |

Figure 14:
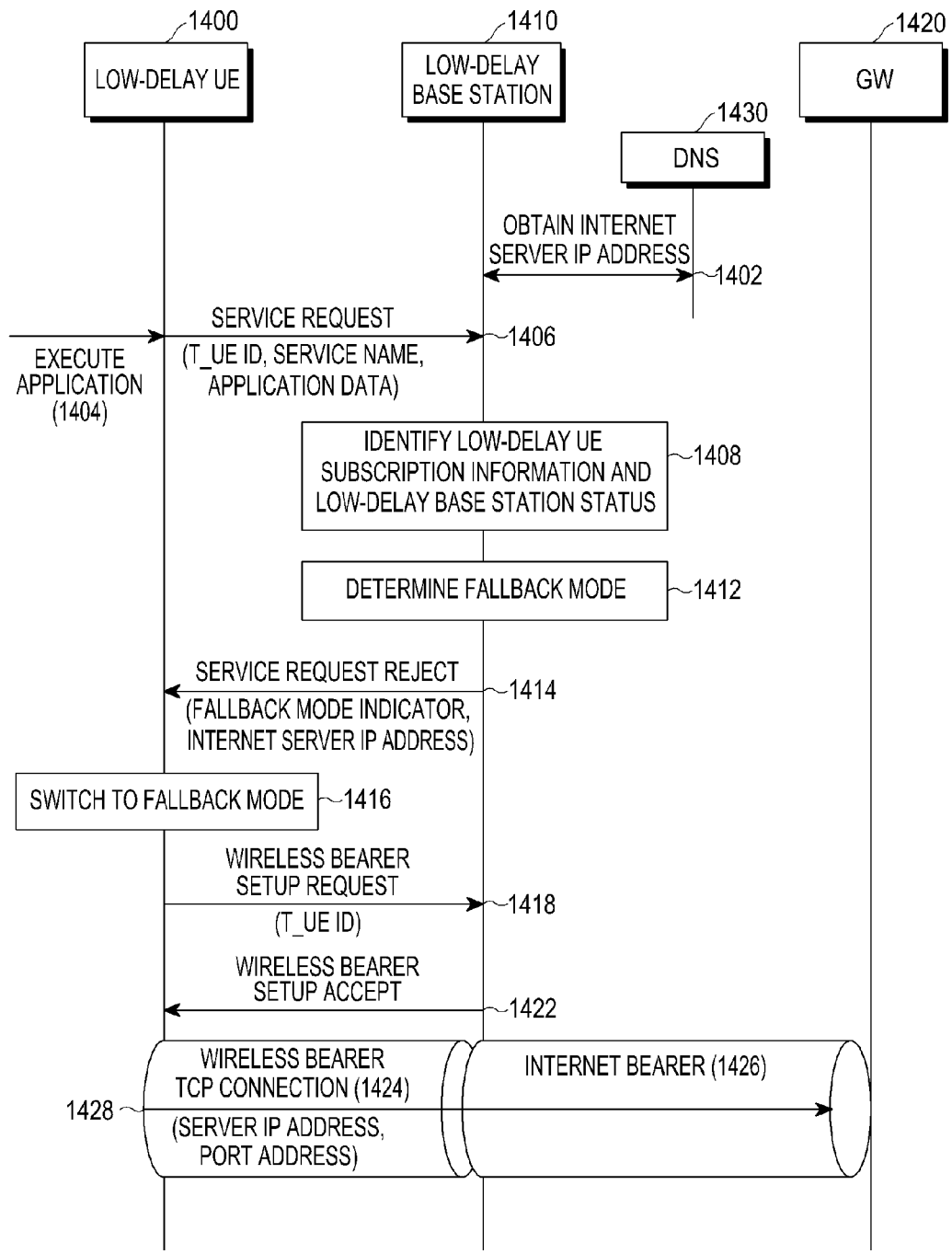
FIG. 14 is a view illustrating an example of a procedure in which a low-delay UE operating in a fallback mode communicates application data with a low-delay base station server in a low-delay providing system according to an embodiment of the present disclosure.

FIG. 14 is a view illustrating an example of a procedure in which a low-delay UE operating in a fallback mode communicates application data with a low-delay base station server in a low-delay providing system according to an embodiment of the present disclosure.

Referring to FIG. 14, the low-delay providing system includes a low-delay UE 1400, a low-delay base station 1410, a GW 1420, and a DNS 1430.

When a low-delay service requested by the low-delay UE 1400 is unavailable, the low-delay base station 1410 requests the low-delay UE 1400 to switch the operation mode to a fallback mode. The low-delay UE 1400 sends a request for a service connection to the low-delay base station 1410 in the fallback mode.

A low-delay service requested by the low-delay UE 1400 is unavailable, e.g., when the low-delay base station server has overload, when the low-delay base station performs admission control on the access to the low-delay base station server, or when the low-delay UE 1400 does not subscribe to a low-delay service or when the subscription information is varied. Or, the low-delay service requested by the low-delay UE 1400 is unavailable when the low-delay base station 1410 determines that it is more effective, in light of efficient use of the network, to receive service content requested by the low-delay UE 1400 from an Internet server than from the low-delay base station server. For example, when the UE 1400 requests a high volume of streaming content (when requesting high-definition streaming content), the UE 1400 may receive a service from the low-delay base station server, and when the UE 1400 requests a low volume of streaming content (when requesting low-definition streaming content), the UE 1400 may switch the service connection to the fallback mode.

The low-delay base station 1410, when the low-delay service supported by the low-delay base station 1410 may be provided through the Internet, obtains the IP address of the Internet server through the DNS 1430 (step 1402). The Internet server IP address obtained in step 1402 is transmitted to the low-delay UE 1400 when the low-delay UE 1400 is requested to switch its operation mode to the fallback mode. Further, the low-delay base station 1410 may periodically update the Internet server IP address. In connection with FIG. 14, a configuration in which the low-delay base station 1410 transmits the Internet server IP address to the low-delay UE 1400 has been described, for example. However, as another example, the low-delay base station 1410 may transmit the domain name of the Internet server to the low-delay UE 1400, and the low-delay UE 1400 may directly figure out the IP address of the Internet server based on the domain name.

When the user executes an application installed on the low-delay UE 1400 (step 1404), the low-delay UE 1400 transmits a service request message to the low-delay base station 1410 to request a connection with an application server, a low-delay base station server (not shown) (step 1406). The service request message includes a T_UE ID, a service name, and first application data generated by the execution of the application in step 1404.

The low-delay base station 1410 identifies the status of the low-delay base station 1410 and the subscription information of the UE for the service requested by the low-delay UE 1400 based on the service name contained in the service request message (step 1408). The low-delay base station 1410 determines that the operation mode of the low-delay UE 1400 as the fallback mode based on the UE capability information received from the low-delay UE 1400 (step 1412). Here, the UE capability information is information indicating whether the UE itself is a low-delay UE having a low-delay stack for operating in the low-delay providing mode.

When determining the operation mode of the low-delay UE 1400 as the fallback mode, the low-delay base station 1410 transmits a service request reject message to the low-delay UE 1400 to instruct to operate in the fallback mode (step 1414). The service request reject message includes a fallback mode indicator indicating to operate in the fallback mode and the Internet server IP address received in step 1402.

The low-delay UE 1400 switches its operation mode to the fallback mode (step 1416) and transmits a wireless bearer setup request message to the low-delay base station 1410 to request the setup of a wireless bearer to be used together with the Internet bearer (step 1418). The wireless bearer setup request includes the T_UE ID.

The low-delay base station 1410 transmits a wireless bearer setup accept message to the low-delay UE 1400 and sets up a wireless bearer between the low-delay UE 1400 and the low-delay base station 1410 (step 1422).

The low-delay UE 1400 transmits a TCP connection message to the Internet server through the GW 1420 and attempts a service connection, i.e., a TCP connection, with the Internet server (step 1428). The TCP connection message is transmitted using the wireless bearer 1424 set up between the low-delay UE 1400 and the low-delay base station 1410 and a preset Internet bearer 1426. The TCP connection message includes the Internet server IP address and a port address.

Figure 15:
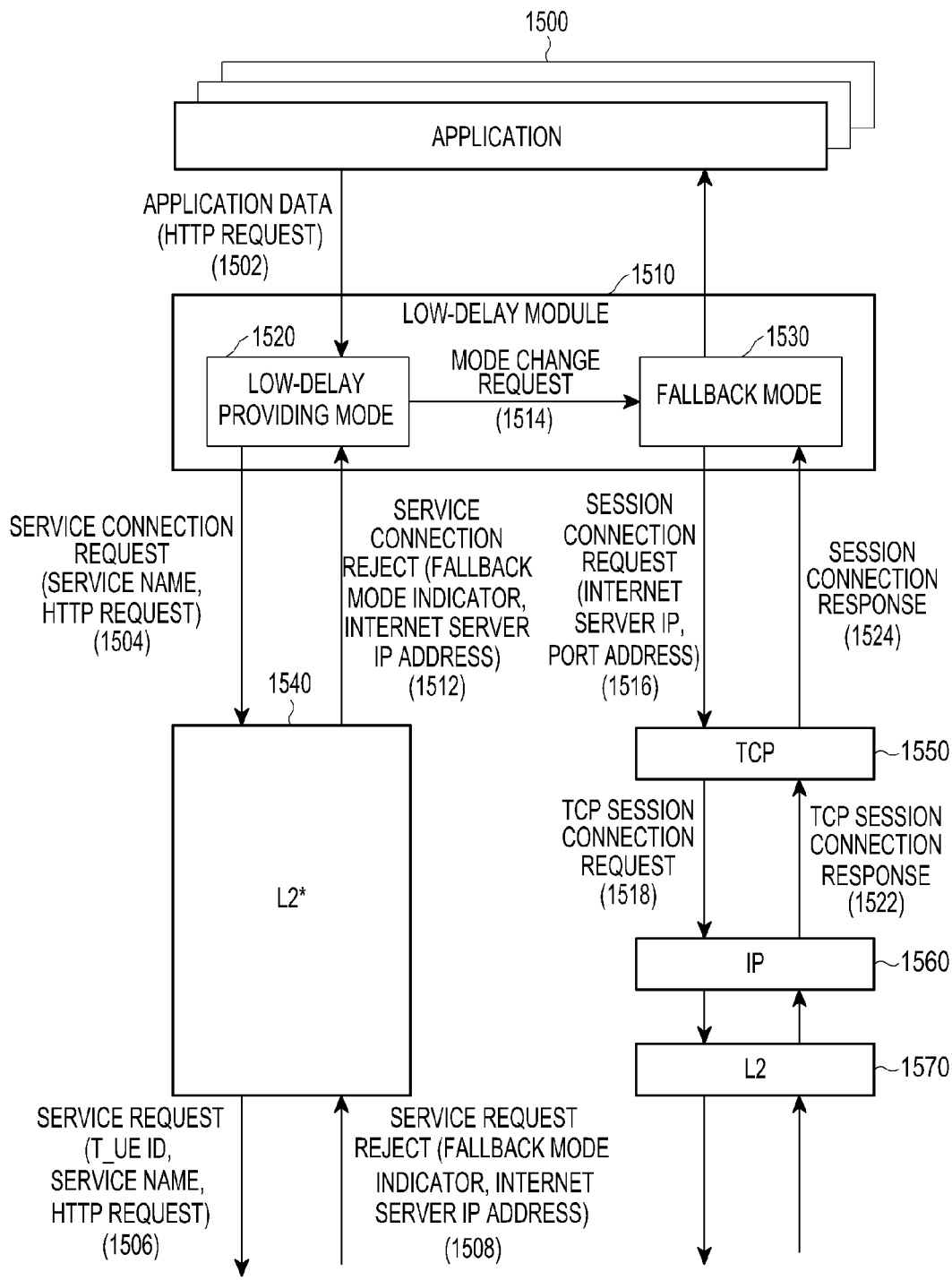
FIG. 15 is a view illustrating an example of an internal operation of a low-delay UE that operates in a fallback mode to communicate application data with a low-delay base station server in a low-delay providing system according to an embodiment of the present disclosure.

FIG. 15 is a view illustrating an example of an internal operation of a low-delay UE that operates in a fallback mode to communicate application data with a low-delay base station server in a low-delay providing system according to an embodiment of the present disclosure.

Referring to FIG. 15, when first application data is generated as the user executes an application 1500, the first application data is transferred to the low-delay module 1510. Here, the first application data may be, e.g., an HTTP request message.

The low-delay module 1510 identifies whether a low-delay service requested by the user is supported by a low-delay base station based on a low-delay service list received from a low-delay base station that is currently connected with a low-delay UE. Here, the low-delay module 1510 is assumed to operate in a low-delay providing mode 1520 as default. The low-delay module 1510, when the low-delay service requested by the user is supported by the low-delay base station, transmits a service connection request message to a L2* layer 1540 to request to establish a service connection with the low-delay base station server (step 1504). The service connection request message contains a service name and the HTTP request received in step 1502. The low-delay module 1510, when the application 1500 is installed, may be aware of the service name corresponding to the application.

The L2* layer 1540 transmits a service request message to the low-delay base station to perform connection establishment with the low-delay base station server (step 1506). The service request message includes the T_UE ID, service name, and the HTTP request received in step 1504. Further, the L2* layer 1540 receives a service request reject message from the low-delay base station in response to the service request message (step 1508). The service request reject message includes a fallback mode indicator instructing to operate in a fallback mode 1530 and the Internet server IP address.

The L2* layer 1540 transmits a service connection reject message to the low-delay module 1510 in response to the service connection request message transmitted in step 1504 (step 1512). The service connection request reject message includes the Internet server IP address and the fallback mode indicator received in step 1508. The low-delay module 1510 identifies the fallback mode indicator included in the service connection request reject message and switches the operation mode of the low-delay UE from the low-delay providing mode to the fallback mode (step 1514). Further, the low-delay module 1510 transmits a session connection request message to a TCP layer 1550 (step 1516). The TCP layer 1550 transmits a TCP session connection request message to the IP layer 1560 (step 1518). The session connection request message includes an Internet server IP address and a port address.

Thereafter, the TCP layer 1550 receives a TCP session connection response message in response to the TCP session connection request message (step 1522) and transmits a session connection response message to the low-delay module 1510 in response to the session connection request message received in step 1516 (step 1524).

The following Table 4 represents example messages communicated between the low-delay module 1510 and the L2* layer 1540.

TABLE 4

Service connection request message
Service connection reject message

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The apparatuses and methods for providing a service connection through an access layer, according to embodiments of the present disclosure, may be implemented in hardware, software, or a combination of hardware and software. Such software may be stored in a volatile or non-volatile storage device such as a read-only memory (ROM) or other storage devices, a memory, such as a random access memory (RAM), a memory chip, a device or an integrated circuit, or a storage medium, such as, e.g., a compact disk (CD), a digital video disk (DVD), a magnetic disk, or a magnetic tape, which allows for optical or magnetic recording while simultaneously read out by a machine (e.g., a computer). The methods for providing the service connection through the access layer according to an embodiment of the present disclosure may be implemented by a computer or portable UE including a controller and a memory, and the memory may be an example of a storage medium that may be read out by a machine appropriate to store a program or programs including instructions for realizing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

Further, according to an embodiment of the present disclosure, the program may be received from the apparatus for providing the service connection through the access layer and may be stored. The program providing device may include a memory for storing a program including instructions to enable the apparatus for providing the service connection through the access layer to perform the methods for providing the service connection through the access layer and information necessary for the method for providing the service connection through the access layer, a communication unit for performing wired or wireless communication with the apparatus for providing the service connection through the access layer, and a controller transmitting the program to the communication device automatically or at the request of the apparatus for providing the service connection through the access layer.

What is claimed is:

1. A method for receiving a service by a user equipment (UE) in a wireless communication system, the method comprising:
    receiving, from a base station, a system information block including base station capability information indicating that the base station supports a low-delay protocol that directly provides a service connection establishment between the UE and a base station server in an access layer of the UE;
    transmitting, from an access layer of the UE to the base station, a service request message including application data for a service request, a service name related to the application data, and a temporary UE identity; and
    receiving, to the access layer of the UE from the base station, a service request accept message including response data of the application data for the service request, the application data provided from the base station server connected with the base station.

2. The method of claim 1, further comprising:
    receiving, from the base station, a service request reject message including an indicator instructing to change an operation mode of the UE and an Internet server internet protocol (IP) address;
    changing the operation mode from a first mode in which a service connection is provided through the access layer to a second mode in which the service connection is provided through a transport layer;
    transmitting, through the transport layer to the base station, a service request message including the Internet server IP address and a port address; and
    receiving, from the base station, a service request accept message including a service provided based on the Internet server IP address.

3. The method of claim 1, wherein the system information block further includes at least one of a service name list of respective service names of services supported by the base station, and a service identity list of identities respectively related to the service names included in the service name list.

4. The method of claim 1, further comprising:
    transmitting, to the base station, an access request message including a UE identity and UE capability information indicating whether the UE is a low-delay UE supporting a low-delay protocol; and
    receiving, from the base station, an access response message including an Internet server internet protocol (IP) address and the temporary UE identity available while connected to a low-delay system providing a low-delay service,
    wherein the temporary UE identity is generated based on a base station identity and the UE identity.

5. The method of claim 1, wherein a protocol stack used by a low-delay UE supporting a low-delay protocol includes a first stack for operating in a first mode providing a service connection through the access layer and a second stack for operating in a second mode providing the service connection through a transport layer, and
    wherein the first stack includes a legacy application layer, a low-delay layer for determining an operation mode of the UE, the access layer, and a physical layer.

6. The method of claim 1, wherein if the UE and the base station server use a plurality of service sessions, the service request message further includes service instance identities respectively corresponding to the plurality of service sessions, and if a plurality of base station servers provide same service to the UE, the service request message further includes a service identity.

7. A method for providing a service by a base station in a wireless communication system, the method comprising:
    transmitting a system information block including base station capability information indicating that the base station supports a low-delay protocol that directly provides a service connection establishment between a user equipment (UE) and a base station server in an access layer of the base station;
    receiving, from an access layer of the UE operating in a low delay protocol, a service request message including application data for a service request, a service name related to the application data, and a temporary UE identity; and
    transmitting, to the access layer of the UE, a service request accept message including response data of the application data for the service request, the application data provided from the base station server connected with the base station.

8. The method of claim 7, further comprising:
    receiving, from the UE, an access request message including a UE identity and UE capability information indicating whether the UE is a low-delay UE supporting a low-delay protocol; and
    transmitting, to the UE, an access response message including an Internet server internet protocol (IP) address and the temporary UE identity available while connected to a low-delay system providing a low-delay service,
    wherein the temporary UE identity is generated based on a base station identity and the UE identity.

9. The method of claim 7, wherein the system information block further includes at least one of a service name list of respective service names of services supported by the base station, and a service identity list of identities respectively related to the service names included in the service name list.

10. The method of claim 7, further comprising:
    transmitting, to the UE, a service request reject message including an indicator instructing to change an operation mode of the UE and an Internet server Internet protocol (IP) address;

receiving a service request message including the Internet server IP address and a port address through a transport layer from the UE changing a first mode to a second mode in which a service connection is provided through the transport layer; and transmitting, to the UE, a service request accept message including a service provided based on the Internet server IP address.

11. The method of claim 7, wherein if the UE and the base station server use a plurality of service sessions, the service request message further includes service instance identities respectively corresponding to the plurality of service sessions, and if a plurality of base station servers provide the same service to the UE, the service request message further includes a service identity.

12. A user equipment (UE) receiving a service in a wireless communication system, the UE comprising:

a controller configured to determining an operation mode of the UE;

a receiver configured to receive, from a base station, a system information block including base station capability information indicating that the base station supports a low-delay protocol that directly provides a service connection establishment between the UE and a base station server in an access layer of the UE; and a transmitter configured to transmit, from the access layer of the UE to the base station, a service request message including application data for a service request, a service name related to the application data, and a temporary UE identity, wherein the receiver is further configured to receive, to the access layer of the UE from the base station, a service request accept message including response data of the application data for the service request, the application data provided from the base station server connected with the base station.

13. The UE of claim 12, wherein the receiver is configured to receive, from the base station, a service request reject message including an indicator instructing to change the operation mode of the UE and an Internet server Internet protocol (IP) address, wherein the controller changes the operation mode from a first mode in which a service connection is provided through the access layer to a second mode in which a service connection is provided through a transport layer, wherein the transmitter is configured to transmit, to the base station, a service request message including the Internet server IP address and a port address through the transport layer, and wherein the receiver is configured to receive a service request accept message including a service provided based on the Internet server IP address from the base station.

14. The UE of claim 12, wherein the system information block further includes at least one of a service name list of respective service names of services supported by the base station, and a service identity list of identities respectively related to the service names included in the service name list.

15. The UE of claim 12, wherein the transmitter is configured to transmit, to the base station, an access request message including a UE identity and UE capability information indicating whether the UE is a low-delay UE supporting the low-delay protocol, wherein the receiver is configured to receive, from the base station, an access response message including an Internet server internet protocol (IP) address and the temporary UE identity available while connected to a low-delay system providing a low-delay service, wherein the temporary UE identity is generated based on a base station identity and the UE identity.

16. The UE of claim 12, wherein a protocol stack used by a low-delay UE supporting the low-delay protocol includes a first stack for operating in a first mode providing a service connection through the access layer and a second stack for operating in a second mode providing the service connection through a transport layer, and wherein the first stack includes a legacy application layer, a low-delay layer for determining the operation mode of the UE, the access layer, and a physical layer.

17. The UE of claim 12, wherein if the UE and the base station server use a plurality of service sessions, the service request message further includes service instance identities respectively corresponding to the plurality of service sessions, and if a plurality of base station servers provide same service to the UE, the service request message further includes a service identity.

18. A base station for providing a service in a wireless communication system, the base station comprising:

a transmitter configured to transmit a system information block including base station capability information indicating that the base station supports a low-delay protocol that directly provides a service connection establishment between the user equipment (UE) and a base station server in an access layer of the base station; and a receiver configured to receive, from an access layer of the UE operating in a low-delay protocol, a service request message including application data for a service request, a service name related to the application data, and a temporary UE identity, wherein the transmitter is further configured to transmit, to the access layer of the UE, a service request accept message including response data of the application data for the service request, the application data provided from the base station server connected with the base station.

19. The base station of claim 18, wherein the receiver is configured to receive, from the UE, an access request message including a UE identity and UE capability information indicating whether the UE is a low-delay UE supporting the low-delay protocol, wherein the transmitter is configured to transmit, to the UE, an access response message including an Internet server internet protocol (IP) address and the temporary UE identity available while connected to a low-delay system providing a low-delay service, wherein the temporary UE identity is generated based on a base station identity and the UE identity.

20. The base station of claim 18, wherein the system information block further includes at least one of a service name list of respective service names of services supported by the base station, and a service identity list of identities respectively related to the service names included in the service name list.

21. The base station of claim 18, wherein the transmitter is configured to transmit, to the UE, a service request reject message including an indicator instructing to change an operation mode of the UE and an Internet server Internet protocol (IP) address, and wherein the receiver is configured to receive, through a transport layer from the UE changing a first mode to a second mode in which a service connection is provided through the transport layer, a service request message including the Internet server IP address and a port address, and wherein the transmitter is configured to transmit, to the UE, a service request accept message including a service provided based on the Internet server IP address.

22. The base station of claim 18, wherein if the UE and the base station server use a plurality of service sessions, the service request message further includes service instance identities respectively corresponding to the plurality of service sessions, and if a plurality of base station servers provide the same service to the UE, the service request message further includes a service identity.

\* \* \* \* \*